US012488289B2

(12) United States Patent
Tao et al.

(10) Patent No.: US 12,488,289 B2
(45) Date of Patent: Dec. 2, 2025

(54) METHOD FOR TRAINING SEQUENCE MINING MODEL, METHOD FOR PROCESSING SEQUENCE DATA, AND DEVICE

(71) Applicant: TENCENT TECHNOLOGY (SHENZHEN) COMPANY LIMITED, Guangdong (CN)

(72) Inventors: Ye Tao, Shenzhen (CN); Huan Jin, Shenzhen (CN); Hongbo Jin, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 926 days.

(21) Appl. No.: 17/701,598

(22) Filed: Mar. 22, 2022

(65) Prior Publication Data

US 2022/0215298 A1    Jul. 7, 2022

Related U.S. Application Data

(63) Continuation of application No. PCT/CN2020/125898, filed on Nov. 2, 2020.

(30) Foreign Application Priority Data

Feb. 18, 2020    (CN) .......................... 202010099547.7

(51) Int. Cl.
*G06N 20/20* (2019.01)
*G06F 18/214* (2023.01)

(52) U.S. Cl.
CPC ......... *G06N 20/20* (2019.01); *G06F 18/2148* (2023.01); *G06F 18/2155* (2023.01)

(58) Field of Classification Search
CPC .................................................... G06N 20/20
(Continued)

(56) References Cited

U.S. PATENT DOCUMENTS

2013/0212049 A1 *  8/2013  Maldonado ............ G06N 3/086
                                                    706/12
2018/0285771 A1    10/2018  Lee et al.
(Continued)

FOREIGN PATENT DOCUMENTS

CN    109255477 A    1/2019
CN    109359793 A    2/2019
(Continued)

OTHER PUBLICATIONS

International Search Report and Written Opinion issued Feb. 4, 2021 in PCT/CN2020/125898.

*Primary Examiner* — Austin Hicks
(74) *Attorney, Agent, or Firm* — ArentFox Schiff LLP

(57) ABSTRACT

The present disclosure includes a method for training a sequence mining model. In the method, a first sequence sample in a target service scenario is obtained. A tag status of the first sequence sample is obtained, the tag status of the first sequence sample indicating a proportion of the first sequence sample that has corresponding tag information. A sub-model from a sequence mining frame is selected according to the tag status to construct the sequence mining model. Also, the sequence mining model is trained by using the first sequence sample. The sequence mining frame includes a first sub-model configured to obtain a latent representation, a second sub-model configured to determine the target tag information when the tag status meets a first condition, and a third sub-model being configured to determine the target tag information when the tag status meets a second condition.

20 Claims, 11 Drawing Sheets

(58) Field of Classification Search
USPC .......................................................... 706/12
See application file for complete search history.

(56) References Cited

U.S. PATENT DOCUMENTS

2019/0140994 A1* 5/2019 Snider .................... H04L 51/234
2020/0050662 A1* 2/2020 Bhat ..................... G06F 18/211

FOREIGN PATENT DOCUMENTS

| CN | 110084374 A | 8/2019 |
| CN | 110414780 A | 11/2019 |
| CN | 110674854 A | 1/2020 |
| CN | 111352965 A | 6/2020 |

* cited by examiner

METHOD FOR TRAINING SEQUENCE MINING MODEL, METHOD FOR PROCESSING SEQUENCE DATA, AND DEVICE

RELATED APPLICATION

This application is a continuation of International Application No. PCT/CN2020/125898, entitled "SEQUENCE MINING MODEL TRAINING METHOD, SEQUENCE DATA PROCESSING METHOD AND DEVICE" and filed on Nov. 2, 2020, which claims priority to Chinese Patent Application No. 202010099547.7, entitled "METHOD FOR TRAINING SEQUENCE MINING MODEL, METHOD FOR PROCESSING SEQUENCE DATA, AND DEVICE" and filed on Feb. 18, 2020. The entire disclosures of the prior applications are hereby incorporated by reference in their entirety.

FIELD OF THE TECHNOLOGY

Embodiments of this application relate to the field of artificial intelligence (AI) and machine learning technologies, and including a method for training a sequence mining model, a method for processing sequence data, and a device.

BACKGROUND OF THE DISCLOSURE

There is usually massive sequence data in risk management service scenarios such as credit card anti-spoofing, anti-alternative account cheating, and anti-deal hunter, and the massive sequence data is processed, to mine and distinguish long-term behavior patterns such as "good" and "bad" in the risk management service scenario.

In the related art, a supervised learning solution is provided for mining of the sequence data in the risk management service scenario. First, all sequence samples are warped and aligned by using a dynamic time warping (DTW) algorithm, then a similarity between every two sequence samples is calculated, and all the sequence samples are classified according to the similarities between the sequences and by using a K-nearest neighbor (KNN) model, so that a "good" sequence sample can be distinguished from a "bad" sequence sample.

However, in different risk management service scenarios, not all sequence samples have tags. The technical solution provided by the related art is applicable to only a risk management service scenario capable of providing a sequence sample with a tag without universality.

SUMMARY

Embodiments of this application include a method for training a sequence mining model, a method for processing sequence data, and a device, which can make full use of historical sequence data in a service scenario, to improve a resource utilization, and improve the accuracy of determining tag information of sequence data by using a sequence mining model. The technical solutions are as follows.

An embodiment of the present disclosure provides a method for training a sequence mining model. In the method, a first sequence sample in a target service scenario is obtained, the first sequence sample including historical sequence data in the target service scenario. A tag status of the first sequence sample is obtained, the tag status of the first sequence sample indicating a proportion of the first sequence sample that has corresponding tag information. A sub-model from a sequence mining frame is selected according to the tag status to construct the sequence mining model, the sequence mining model being configured to determine target tag information of target sequence data in the target service scenario. Also, the sequence mining model is trained by using the first sequence sample. The sequence mining frame includes a first sub-model, a second sub-model, and a third sub-model, the first sub-model being configured to obtain a latent representation of the target sequence data, the second sub-model being configured to determine the target tag information of the target sequence data according to the latent representation of the target sequence data in a case that the tag status meets a first condition, and the third sub-model being configured to determine the target tag information of the target sequence data according to the latent representation of the target sequence data in a case that the tag status meets a second condition. The first condition includes that the tag status indicates that the first sequence sample has no tag information, and the second condition includes that the tag status indicates that the first sequence sample at least partially has the tag information.

An embodiment of the present disclosure further provides an apparatus for training a sequence mining model. The apparatus includes processing circuitry that is configured to obtain a first sequence sample in a target service scenario, the first sequence sample comprising historical sequence data in the target service scenario. The processing circuitry that is configured to determine a tag status of the first sequence sample, the tag status of the first sequence sample indicating a proportion of the first sequence sample that has corresponding tag information. The processing circuitry that is configured to select a sub-model from a sequence mining frame according to the tag status to construct a sequence mining model, the sequence mining model being configured to determine target tag information of target sequence data in the target service scenario. Also, the processing circuitry that is configured to train the sequence mining model by using the first sequence sample. The sequence mining frame includes a first sub-model, a second sub-model, and a third sub-model, the first sub-model being configured to obtain a latent representation of the target sequence data, the second sub-model being configured to determine the target tag information of the target sequence data according to the latent representation of the target sequence data in a case that the tag status meets a first condition, and the third sub-model being configured to determine the target tag information of the target sequence data according to the latent representation of the target sequence data in a case that the tag status meets a second condition. The first condition includes that the tag status indicates that the first sequence sample has no tag information, and the second condition includes that the tag status indicates that the first sequence sample at least partially has the tag information.

An embodiment of the present disclosure further provides a non-transitory computer-readable storage medium storing instructions which when executed by a processor cause the processor to train a sequence mining model. The operations include a first sequence sample in a target service scenario is obtained, the first sequence sample including historical sequence data in the target service scenario. A tag status of the first sequence sample is obtained, the tag status of the first sequence sample indicating a proportion of the first sequence sample that has corresponding tag information. A sub-model from a sequence mining frame is selected according to the tag status to construct the sequence mining model, the sequence mining model being configured to determine target tag information of target sequence data in the target service scenario. Also, the sequence mining model is trained by using the first sequence sample. The sequence mining frame includes a first sub-model, a second sub-model, and a third sub-model, the first sub-model being configured to obtain a latent representation of the target sequence data, the second sub-model being configured to determine the target tag information of the target sequence data according to the latent representation of the target sequence data in a case that the tag status meets a first condition, and the third sub-model being configured to determine the target tag information of the target sequence data according to the latent representation of the target sequence data in a case that the tag status meets a second condition. The first condition includes that the tag status indicates that the first sequence sample has no tag information, and the second condition includes that the tag status indicates that the first sequence sample at least partially has the tag information.

BRIEF DESCRIPTION OF THE DRAWINGS

To describe the technical solution in the embodiments of this application more clearly, the accompanying drawings for describing the embodiments are briefly described hereinafter. The accompanying drawings in the following description show merely some embodiments of this application, and a person of ordinary skill in the art may obtain other accompanying drawings from these accompanying drawings.

DESCRIPTION OF EMBODIMENTS

Figure 1:
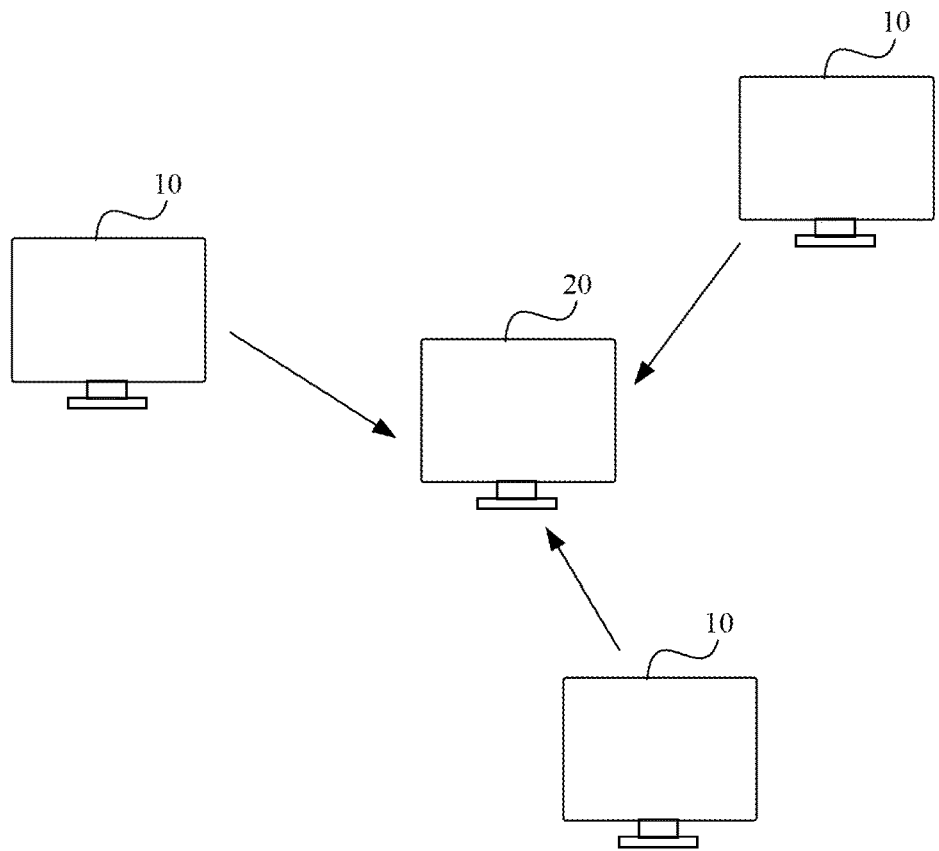
FIG. 1 is a schematic diagram of an implementation environment according to an embodiment of this application.

The technical solution provided in the embodiments of this application includes a sequence mining frame. In an actual application in some embodiments, a sequence sample in a target service scenario is obtained, a sub-model is selected from the sequence mining frame according to a tag status of the sequence sample to construct a sequence mining model, and then the sequence mining model is trained by using the sequence sample, so that the trained sequence mining model may be used for determining tag information of sequence data in the target service scenario. In addition, the sequence mining frame provided in the embodiments of this application may be universal in different service scenarios. In some embodiments, the sequence mining frame includes at least one sub-model, and one or more corresponding sub-model may be selected from the sequence mining frame for different tag statuses of historical sequence data in different service scenarios, to construct the sequence mining model. In addition, compared with the related art in which only a single model with a fixed structure can be used for training, causing a part of historical sequence data to be unavailable in a service scenario, for example, in the related art, only a non-supervised clustering model can be used for training, causing historical sequence data having tag information to be unavailable in a service scenario, resulting in a waste of resources. In the technical solution provided in the embodiments of this application, different sub-models may be used for training for different tag statuses of historical sequence data, to make full use of all historical sequence data in a service scenario, thereby improving the resource utilization. In addition, in the technical solution provided in the embodiments of this application, the sequence mining model may be fully trained by using all the historical sequence data in the target service scenario, to improve the accuracy of determining tag information of sequence data by using the sequence mining model.

To make objectives, technical solutions, and advantages of this application clearer, the following further describes implementations of this application in detail with reference to the accompanying drawings.

Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/ interaction system, and electromechanical integration. AI software technologies mainly include several major directions such as a computer vision (CV) technology, a speech processing technology, a natural language processing technology, and machine learning/deep learning.

Machine learning (ML) is a multi-field interdiscipline, and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. The ML and deep learning generally include technologies such as an artificial neural network, a belief network, reinforcement learning, transfer learning, inductive learning, and learning from demonstrations.

The technical solution provided in the embodiments of this application involves ML/deep learning technologies of AI, and are illustrated by using the following embodiments.

FIG. 1 shows an embodiment of an implementation environment according to an embodiment of this application. The implementation environment may include one or more first computer devices 10 and a second computer device 20.

The computer device refers to a device with a data analysis and processing function and a storage function, for example, a personal computer (PC) and a server with a data storage capability and/or data processing capability, or a terminal such as a mobile phone, a tablet computer, a multimedia playback device, or a wearable device, or may be another computer device, which is not limited in the embodiments of this application. In some embodiments, when the computer device is the server, the computer device may be one server, a server cluster including a plurality of servers, or a cloud computing service center.

The first computer device 10 is a computer device with a data storage and transmission function in a specific service scenario. In some embodiments, a specific service scenario may correspond to one first computer device 10 or may correspond to a plurality of first computer devices 10. In one embodiment, the first computer device 10 may obtain sequence data in a specific service scenario to which the first computer device is applied, and store the sequence data or transmit the sequence data to the second computer device 20, and the second computer device 20 analyzes and processes the sequence data.

The second computer device 20 has a data analysis and processing function and can process the sequence data. In some embodiments, the second computer device 20 may train a machine learning model according to the sequence data and/or invoke a machine learning model to determine tag information of the sequence data. In some embodiments, the second computer device 20 stores a sequence mining frame. For a specific service scenario, the second computer device 20 may select some or all of sub-models from the sequence mining frame to form a sequence mining model corresponding to the specific service scenario, and train the sequence mining model by using historical sequence data in the specific service scenario, so that the trained sequence mining model may be used for determining tag information (or target tag information) of sequence data (or target sequence data) in the specific service scenario.

In this embodiment of this application, the first computer device 10 may communicate with the second computer device 20 through a network. The network may be a wired network or may be a wireless network. For example, the second computer device 20 may obtain historical sequence data in a target service scenario from the first computer device 10, form a sequence sample according to the historical sequence data, then select a corresponding sub-model from a sequence mining frame according to tag information of the sequence sample to form a sequence mining model, and train the sequence mining model by using the sequence sample, so that the second computer device 20 may process sequence data in the target service scenario by invoking the sequence mining model, to obtain tag information of the sequence data.

Figure 2:
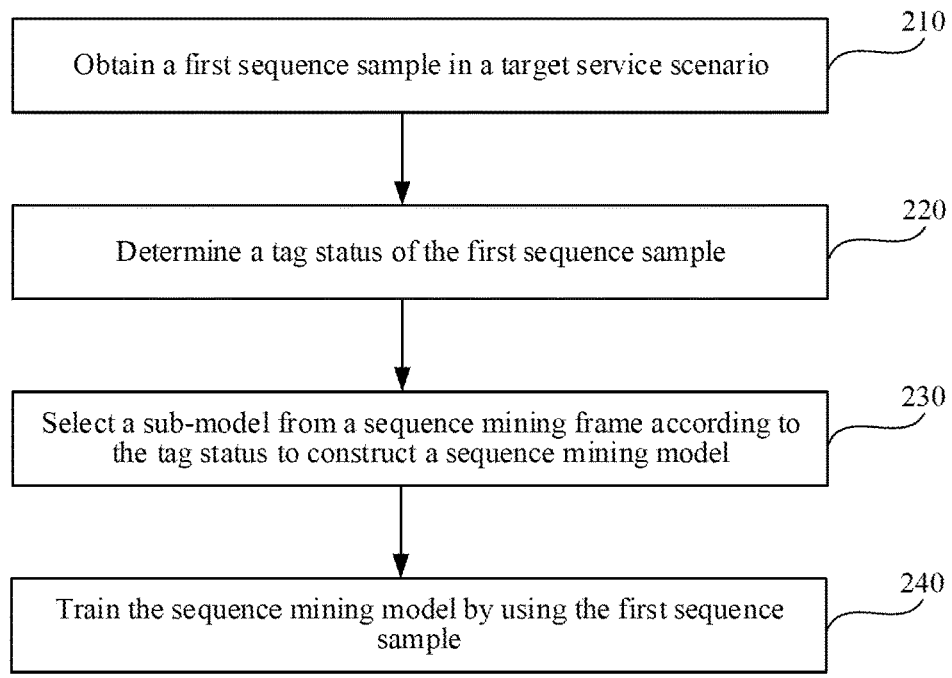
FIG. 2 is a flowchart of a method for training a sequence mining model according to an embodiment of this application.

FIG. 2 is a flowchart of a method for training a sequence mining model according to an embodiment of this application. The method is applicable to the computer device described above. The method may include the following steps (210 to 240):

In step 210, a first sequence sample in a target service scenario is obtained.

The target service scenario is a service scenario that requires determination of tag information of sequence data in the service scenario. A type of the target service scenario is not limited to the examples described in this application. In some embodiments, the target service scenario includes a finance transaction service scenario (for example, a securities transaction system and a currency payment system), an Internet of Things service scenario (for example, a wearable device and a smart home system), an environmental monitoring service scenario (for example, a humidity monitoring system and an air particulate matter monitoring system), a smart medical care service scenario (for example, a body key indicator tracking system and a health condition monitoring system), an event applicable program application scenario (for example, a user information management system and a member management system), and the like. The sequence data, such as time sequence data, is data collected at different times in the target service scenario and is used for describing a condition that a phenomenon that occurs in the target service scenario changes over time. For example, it is assumed that the target service scenario is a member management system. In this example, after a user registers a membership account with a platform corresponding to the member management system, each behavior of the user on the platform forms sequence data, and all sequence data corresponding to the user may reflect a behavior pattern of the user after registering as a member on the platform, for example, reflect a frequency of the user purchasing discounted products by using a member qualification.

The first sequence sample is a sample used for training a sequence mining model. In this embodiment of this application, the first sequence sample includes historical sequence data in the target service scenario. In some embodiments, the first sequence sample includes at least one sequence sample. Each sequence sample may be formed by one piece of historical sequence data or may be formed by a plurality of pieces of historical sequence data. This is not limited in this embodiment of this application. In one exemplary application, a quantity of sequence samples in the first sequence sample and a specific composition of the sequence sample may be determined according to processing overheads of the computer device and an actual service scenario.

In step 220, a tag status of the first sequence sample is determined.

The tag status of the first sequence sample is used for indicating a proportion of the first sequence sample that has corresponding tag information. The tag information is used for reflecting a feature attribute of the first sequence sample. In one embodiment of this application, specific content of the tag information is determined according to the target service scenario. In some embodiments, when a requirement on the accuracy of tag information of sequence data is relatively low, to reduce a model training time and processing overheads of the computer device, the tag information may include two types of "good" and "bad", "good" meaning that it is consistent with a main service of the target service scenario, and "bad" meaning that it is deviated from the main service of the target service scenario. For example, it is assumed that the target service scenario is a credit card management system, in the target service scenario, tag information of a first sequence sample may include "good" and "bad", "good" meaning that a credit card is normally used, and "bad" meaning that a credit card is abnormally used. If the target service scenario requires relatively high accuracy of tag information of sequence data, the tag information may be further divided, for example, "bad" is subdivided into "money-laundering" and "fraud".

Because the sequence data does not necessarily have the tag information when being generated, in different service scenarios, there may be different cases that the sequence data has the tag information. Therefore, tag statuses of first sequence samples corresponding to different service scenarios may also be different. The tag status of the first sequence sample in the target service scenario is not limited to the examples described in this application. In some embodiments in the target service scenario, the tag status of the first sequence sample may be that the first sequence sample has no tag information or may be that a part of first sequence sample has tag information and a part of first sequence sample has no tag information.

In step 230, a sub-model is selected from a sequence mining frame according to the tag status to construct a sequence mining model.

The sequence mining frame is used for constructing a sequence mining model for different service scenarios. The sequence mining frame provided in this embodiment of this application includes a plurality of sub-models. The computer device may select at least one sub-model from the sequence mining frame according to the tag status of the first sequence sample, that is, a case that historical sequence data in the target service scenario has tag information, to construct a sequence mining model. In this embodiment of this application, a sequence mining frame fused with a plurality of sub-models is provided. For different service scenarios, the sequence mining frame may be used for constructing a sequence mining model adaptable to a tag status of sequence data in a service scenario thereof. Compared with the related art in which only a single model with a fixed structure can be used for processing sequence data, resulting in a waste of resources, for example, only a non-supervised clustering model can be used for processing sequence data. According to the related art, a sequence sample having tag information in a service scenario cannot use the model. In the technical solution provided in this embodiment of this application, all historical sequence data in a service scenario can be fully utilized, to improve resource utilization.

In some embodiments, the sequence mining frame includes a first sub-model, a second sub-model, and a third sub-model. The first sub-model is configured to obtain a latent representation of the sequence data (or the target sequence data), the latent representation of sequence data being a vector representation formed after key feature information in the sequence data is extracted. In some embodiments, the first sub-model may be a deep autoencoder (AE) model. For an exemplary obtaining process of the latent representation, reference is made to the following embodiments. Details are not described herein again. The second sub-model is configured to determine tag information (or the target tag information) of the sequence data (or the target sequence data) according to the latent representation of the sequence data in a case that the tag status of the first sequence sample meets a first condition, the first condition including that the tag status is that the first sequence sample has no tag information. In some embodiments, the second sub-model may be a clustering model such as a K-means clustering model. The third sub-model is configured to determine the tag information (or the target tag information) of the sequence data (or the target sequence data) according to the latent representation of the sequence data (or the target sequence data) in a case that the tag status of the first sequence sample meets a second condition, the second condition including that the tag status is that the first sequence sample at least partially has the tag information. In some embodiments, the third sub-model may be a standard classification model, a learning from positive and unlabeled example (PULearning) model, or the like. For composition structures and implementations of the first sub-model, the second sub-model, and the third sub-model, reference is made to the following embodiments. Details are not described herein again.

In step 240, the sequence mining model is trained by using the first sequence sample.

The sequence mining model is configured to determine the tag information of the sequence data in the target service scenario. After selecting, according to the tag status of the first sequence sample, that is, the tag status of the historical sequence data in the target service scenario, the sub-model adaptable to the tag status from the sequence mining frame to construct the sequence mining model, the computer device may train the sequence mining model by using the first sequence sample, so that the trained sequence mining model may be used for determining the tag information of the sequence data in the target service scenario. In the technical solution provided in this embodiment of this application, a sequence mining model may be trained by using all historical sequence data in a target service scenario. Compared with the related art in which when a single model with a fixed structure is used, the single model is trained by using only a part of historical sequence data adaptable to the single mode, in the technical solution provided in this embodiment of this application, the sequence mining model is fully trained according to the historical sequence data in the target service scenario, to improve the accuracy of determining tag information of sequence data by using the sequence mining model.

In some embodiments, second sub-model and the third sub-model may be used as sub-models for constructing a sequence mining model at the same time. In some embodiments, the second sub-model and the third sub-model have the same functional role in the sequence mining model. For example, it is assumed that in a target service scenario, a part of first sequence sample has tag information and a part of first sequence sample has no tag information. In this case, the third sub-model can be trained by using the part of the first sequence sample with the tag information. An objective of training the third sub-model is to make a latent representation obtained by using the first sub-model more reliable. The second sub-model can be trained by using the part of the first sequence sample without the tag information. An objective of training the second sub-model is to classify a sequence sample without the tag information in the first sequence sample according to a possible tag information type in the target service scenario. Therefore, the second sub-model may learn behavior patterns represented by different sequence samples with tag information, so that when there is new sequence data in the target service scenario, tag information of the sequence data may be finally determined by using the second sub-model. For a specific example of a training process of the second sub-model and the third sub-model when the second sub-model and the third sub-model are used as sub-models of a sequence mining model at the same time, reference is made to the following optional embodiments. Details are not described herein again.

In one embodiment of this application, beneficial effects and a training process of the sequence mining model are described by using only an example in which the first sequence sample is formed by all the historical sequence data in the target service scenario. After understanding the technical solution of this embodiment of this application, variations can include, for example, in an exemplary application, considering factors such as processing overheads of the computer device and representativeness of a sample, processing such as screening may be performed on massive amounts of historical sequence data in the target service scenario, to select a part of historical sequence data to form the first sequence sample. This and other variations still fall within the protection scope of this embodiment of this application.

Based on the foregoing, according to the technical solution provided in this embodiment of this application, a sequence mining frame is provided. In an exemplary application, a sequence sample in a target service scenario is obtained, a sub-model is selected from the sequence mining frame according to a tag status of the sequence sample to construct a sequence mining model, and then the sequence mining model is trained by using the sequence sample, so that the trained sequence mining model may be used for determining tag information of sequence data in the target service scenario. In addition, the sequence mining frame provided in this embodiment of this application may be universal in different service scenarios. The sequence mining frame includes at least one sub-model, and a corresponding sub-model may be selected from the sequence mining frame for different tag statuses of historical sequence data in different service scenarios, to construct the sequence mining model. In addition, compared with the related art in which only a single model with a fixed structure can be used for training, causing a part of historical sequence data to be unavailable in a service scenario, for example, in the related art, only a non-supervised clustering model can be used for training, causing historical sequence data having tag information to be unavailable in a service scenario, resulting in a waste of resources. In the technical solution provided in this embodiment of this application, different sub-models may be used for training for different tag statuses of historical sequence data, to make full use of all historical sequence data in a service scenario, thereby improving the resource utilization. In addition, in the technical solution provided in this embodiment of this application, the sequence mining model may be fully trained by using all the historical sequence data in the target service scenario, to improve the accuracy of determining the tag information of the sequence data by using the sequence mining model.

Figure 3:
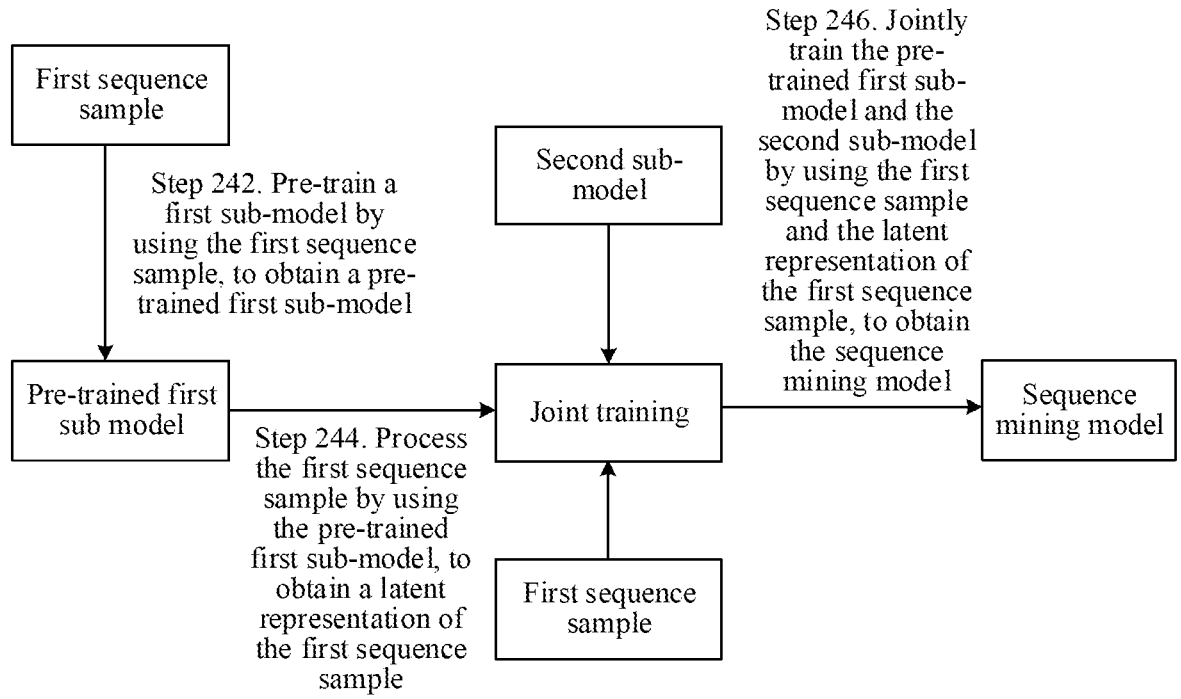
FIG. 3 is a flowchart of a method for training a sequence mining model according to another embodiment of this application.

In an exemplary implementation, the tag status is that the first sequence sample has no tag information, and the sequence mining model includes the first sub-model and the second sub-model. As shown in FIG. 3, step 240 includes the following substeps (242 to 246).

In step 42, a first sub-model is pre-trained by using the first sequence sample, to obtain a pre-trained first sub-model.

The first sub-model is a sub-model used for obtaining a latent representation of sequence data. In some embodiments, the first sub-model may be a deep autoencoder model and may perform representation learning on the first sequence sample by using the first sequence sample as a learning target, to obtain a latent representation of the first sequence sample. In one embodiment of this application, the computer device performs pre-training of the first sub-model by using the first sequence sample, so that a relatively reliable latent representation of the first sequence sample may be obtained by using the pre-trained first sub-model. In addition, compared with the first sequence sample, the latent representation of the first sequence sample reduces a dimension and a sequence length of the first sequence sample while retaining key feature information in the first sequence sample, so that when another sub-model may be trained by using the latent representation of the first sequence sample, processing overheads of the computer device are reduced.

Figure 4:
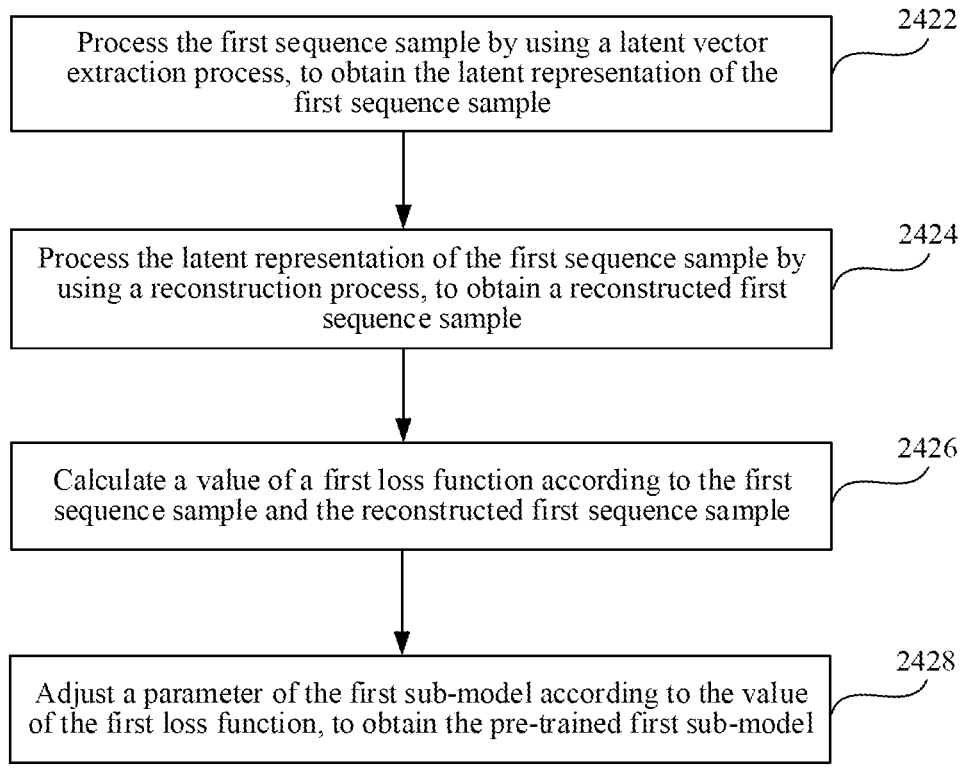
FIG. 4 is a flowchart of a method for performing pre-training of a first sub-model according to an embodiment of one this application.

In an example, the first sub-model includes a latent vector extraction process and a reconstruction process. As shown in FIG. 4, step 242 includes the following substeps (2422 to 2428).

In step 2422, the first sequence sample is processed by using the latent vector extraction process, to obtain a latent representation of the first sequence sample.

Figure 5:
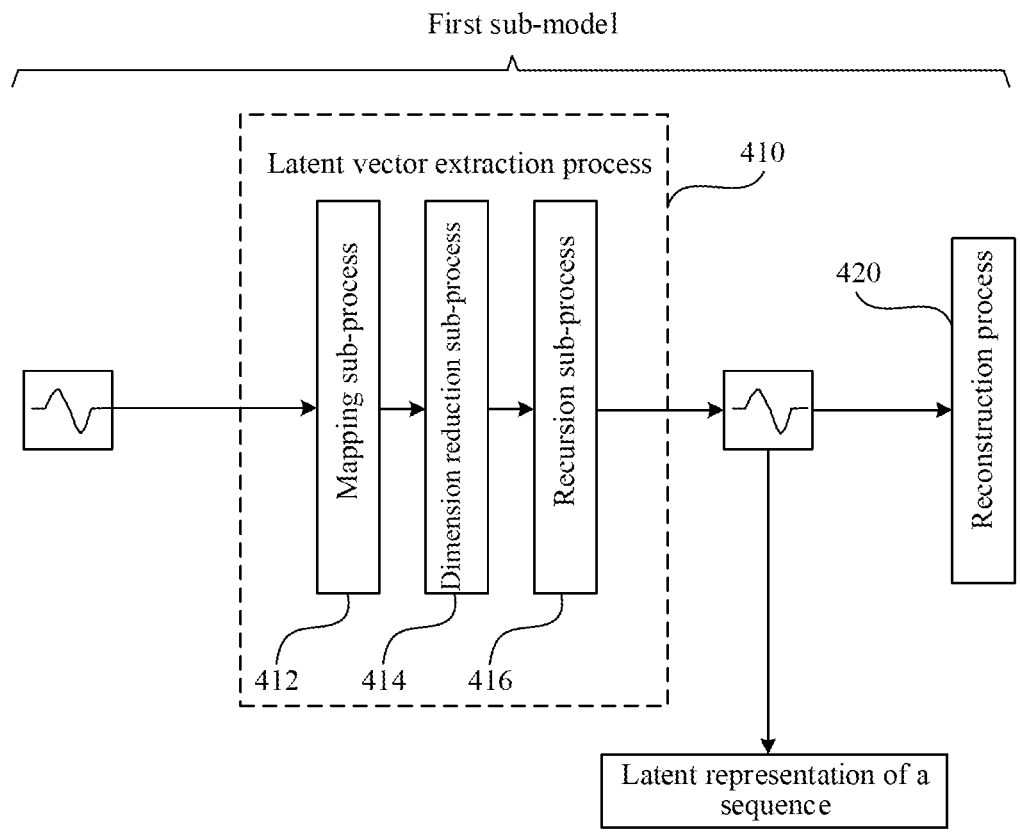
FIG. 5 is a block diagram of a first sub-model according to an embodiment of this application.

FIG. 5 is a possible block diagram of a first sub-model. The first sub-model includes a latent vector extraction process 410 and a reconstruction process 420. When the first sub-model is implemented as a deep autoencoder model, the latent vector extraction process 410 may be implemented as an encoder in the deep autoencoder model, and the reconstruction process 420 may be implemented as a decoder in the deep autoencoder model. The computer device may process the first sequence sample by using the latent vector extraction process 410, to obtain a latent representation of the first sequence sample.

In some embodiments, as shown in FIG. 5, the latent vector extraction process 410 includes a mapping sub-process 412, a dimension reduction sub-process 414, and a recursion sub-process 416. Step 2422 includes the following substeps.

(1) Obtain feature information of the first sequence sample by using a mapping sub-process, to obtain a feature information representation of the first sequence sample.

In some embodiments, a shape of the first sequence sample inputted into the first sub-model may be represented as [batch_size, time_steps, feature_nums], "batch_size" being used for representing a quantity of sequence samples in the first sequence sample, "time_steps" being used for representing a length of the first sequence sample, and "feature_nums" being used for representing a quantity of features of the first sequence sample.

The computer device may extract feature information of the first sequence sample by using the mapping sub-process and retain a sequence structure of the first sequence sample. When the first sub-model is implemented as the deep autoencoder model, the mapping sub-process may be implemented as one-dimensional deep convolutional neural network (1DCNN), and the computer device performs convolution kernel mapping on the first sequence sample from top to bottom by using the 1DCNN, to obtain the feature information of the first sequence sample.

(2) Perform dimension reduction on the feature information of the first sequence sample by using a dimension reduction sub-process, to obtain dimension-reduction feature information of the first sequence sample.

After the feature information of the first sequence sample is obtained, the first sequence sample may be further compressed, to avoid relatively large processing overheads of the computer device caused by processing relatively long sequence data. The dimension reduction sub-process in the first sub-model may reduce a dimension of the feature information of the first sequence sample, to obtain dimension-reduction feature information of the first sequence sample. When the first sub-model is implemented as the deep autoencoder model, the dimension reduction sub-process may be implemented as a max pooling operation. During the max pooling operation, a leaky rectified activation function may be used. The computer device compresses the first sequence sample into a compact vector representation, that is, the dimension-reduction feature information of the first sequence sample, by using the max pooling operation.

(3) Learn a change rule of a step length between sequences of the dimension-reduction feature information of the first sequence sample by using a recursion sub-process, to obtain the latent representation of the first sequence sample.

To further compress the firs sequence sample, the computer device may learn a change rule of a step length between sequences of the dimension-reduction feature information of the first sequence sample by using the recursion sub-process, to obtain the latent representation of the first sequence sample, so as to complete step of encoding the first sequence sample. When the first sub-model is implemented as the deep autoencoder model, the recursion sub-process may be implemented as a Bi-long short-term memory (LSTM) network. The Bi-LSTM network may learn the change rule of the step length between the sequences in two directions (forward and backward), to further compress the first sequence sample, so as to obtain the latent representation of the first sequence sample.

In step 2424, the latent representation of the first sequence sample is processed by using the reconstruction process, to obtain a reconstructed first sequence sample.

In this embodiment of this application, to make the latent representation obtained by using the first sub-model relatively reliable, after obtaining the latent representation of the first sequence sample by using the latent vector extraction process, the computer device may process the latent representation of the first sequence sample by using the reconstruction process, to restore the latent representation to sequence data, so as to obtain a reconstructed first sequence sample. When the first sub-model is implemented as the deep autoencoder model, the reconstruction process may be implemented as an upsample function and a deconvolution operation. The computer device passes the latent representation of the first sequence sample through the upsample function and then performs the deconvolution operation, to obtain an output sequence, so as to complete a decoding process of the latent representation, the output sequence being the reconstructed first sequence sample.

In step 2426, a value of a first loss function is calculated according to the first sequence sample and the reconstructed first sequence sample.

The first loss function is a loss function corresponding to the first sub-model. The computer device may determine a first loss function according to the first sequence sample and the reconstructed first sequence sample, to calculate a value of the first loss function. In some embodiments, the value of the first loss function may be a mean absolute error (MAE) of the reconstructed first sequence sample. That is, the value of the first loss function may be obtained through calculation by using the following formula:

$$ae\_loss = \frac{1}{n}\Sigma_{i=1}^{n}|h(x_i) - x_i|,$$

where ae_loss represents the value of the first loss function, $x_i$ represents an $i^{th}$ inputted sequence sample in the first sequence sample, and $h(x_i)$ represents the reconstructed sequence sample obtained through the latent vector extraction process and the reconstruction process of the first sub-model and corresponding to $x_i$, i being a positive integer.

In step 2428, a parameter of the first sub-model is adjusted according to the value of the first loss function, to obtain the pre-trained first sub-model.

During training of a model, a loss function of the model may converge by adjusting a parameter of the model, to complete training of the model. In one embodiment of this application, the computer device adjusts a parameter of the first sub-model according to the value of the first loss function, so that the first loss function converges, to obtain the pre-trained first sub-model.

In step 244, the first sequence sample is processed by using the pre-trained first sub-model, to obtain a latent representation of the first sequence sample.

The loss function converges, and an error between the reconstructed first sequence sample and the originally inputted first sequence sample falls within a tolerance range. Therefore, a latent representation of the first sequence sample obtained by using the pre-trained first sub-model is relatively reliable. After obtaining the pre-trained first sub-model, the computer device processes the first sequence sample again by using the pre-trained first sub-model, to obtain a latent representation of the first sequence sample.

In some embodiments, a shape of the latent representation of the first sequence sample may be represented as [batch_size, time_step2, 1], "time_step2" representing a sequence length of the latent representation of the first sequence sample, and "1" representing one feature of the latent representation of the first sequence sample. In this embodiment of this application, "time_step2" meets "time_step2<time_step", "time_step" representing a sequence length of the first sequence sample.

Figure 6:
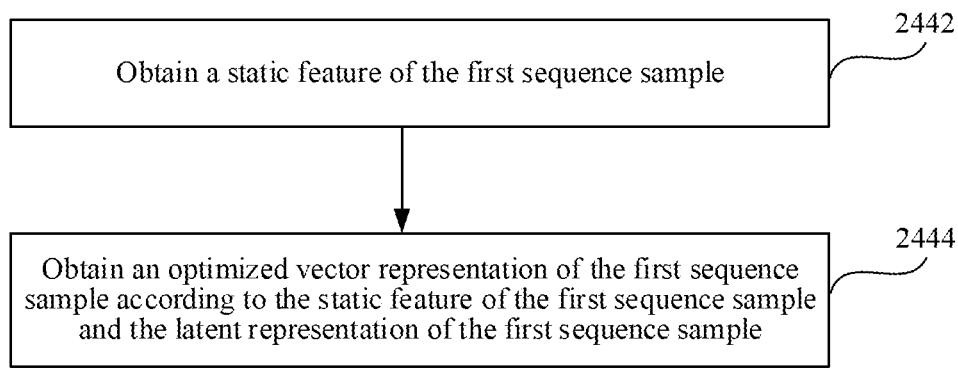
FIG. 6 is a flowchart of a method for calculating an optimized vector representation according to an embodiment of this application.

In an example, as shown in FIG. 6, after step 244, the method may further include the following steps (2442 and 2444).

In step 2442, a static feature of the first sequence sample is obtained.

In an exemplary application, the target service scenario further includes some static data, the static data representing stable static feature of sequence data. For example, it is assumed that the target service scenario is a credit card management system, sequence data may include a historical transaction amount sequence, a historical transaction time interval sequence, and the like of a credit card user, and static data may include a quantity of registered phone numbers, a country in which the user is located, a nationality of the user, and the like. In the related art, only sequence data of a first sequence sample is considered, but a static feature of the first sequence sample is ignored. Consequently, the static data is not used in the model training process, and the trained model is insufficiently accurate. In the technical solution provided in one or more embodiments of this application, the computer device may obtain a static feature of the first sequence sample, so that the static data is applicable to a training process of a model, to improve the accuracy of the sequence mining model and data resource utilization.

In step 2444, an optimized vector representation of the first sequence sample is obtained according to the static feature of the first sequence sample and the latent representation of the first sequence sample.

The computer device may combine the static feature of the first sequence sample into the latent representation of the first sequence sample, to obtain an optimized vector representation of the first sequence sample, the optimized vector representation of the first sequence sample being used for jointly training the pre-trained first sub-model and the second sub-model subsequently. In some embodiments, a latent representation of an $i^{th}$ sequence sample in the first sequence sample is recorded as $z_i$, and a shape of $z_i$ may be represented as [time_step2, 1]. It is assumed that the $i^{th}$ sequence sample has n static features, n being a positive integer, shapes of the static features of the $i^{th}$ sequence sample may be represented as [n, 1]. The computer device may obtain an optimized vector representation of the $i^{th}$ sequence sample according to the latent representation and the static features of the $i^{th}$ sequence sample. In some embodiments, a shape of the optimized vector representation of the $i^{th}$ sequence sample may be represented as [n+time_step2, 1].

In some embodiments, step 2444 includes the following substeps.

(1) Regularize the static feature of the first sequence sample, to obtain a regularized static feature.

Regularization means that all feature variables of data are retained and orders of magnitude of the feature variables are reduced, to avoid overfitting, that is, due to an excessively large quantity of feature variables, the model is too complex. In this embodiment of this application, because the first sequence sample includes at least one static feature, the static feature of the first sequence sample may be regularized in advance, to reduce orders of magnitude of static features of the first sequence sample, so as to obtain a regularized static feature.

(2) Generalize the latent representation of the first sequence sample, to obtain a generalized latent representation.

In this embodiment of this application, the computer device may generalize the latent representation of the first sequence sample, to adjust an order of magnitude of the latent representation of the first sequence sample. In some embodiments, the computer device may perform generalization by adding a generalizer to the recursion sub-process of the first sub-model. For example, when the first sub-model is implemented as the deep autoencoder model, the recursion sub-process may be a Bi-LSTM network. In this case, layer normalization may be added to the Bi-LSTM network, to adjust the order of magnitude of the latent representation.

(3) Obtain the optimized vector representation of the first sequence sample according to the regularized static feature and the generalized latent representation.

After the static feature of the first sequence sample is regularized and the latent representation of the first sequence sample is generalized, a value of a regularized static feature and a value of a generalized latent representation have a same order of magnitude. Subsequently, an optimized vector representation of the first sequence sample is obtained according to the regularized static feature and the generalized latent representation. Compared with an optimized vector representation obtained by directly combining the static feature and the latent representation, the optimized vector representation of which an order of magnitude is adjusted may reduce processing overheads of the computer device in a subsequent joint training process and improve the calculation precision.

In step 246, the pre-trained first sub-model and the second sub-model are jointly trained by using the first sequence sample and the latent representation of the first sequence sample, to obtain the sequence mining model.

The computer device may jointly train the pre-trained first sub-model and the second sub-model by using the first sequence sample and the latent representation of the first sequence sample, that is, train the pre-trained first sub-model by using the first sequence sample and train the second sub-model by using the latent representation of the first sequence sample, to obtain the sequence mining model, the sequence mining model including the jointly trained first sub-model and the jointly trained second sub-model.

Figure 7:
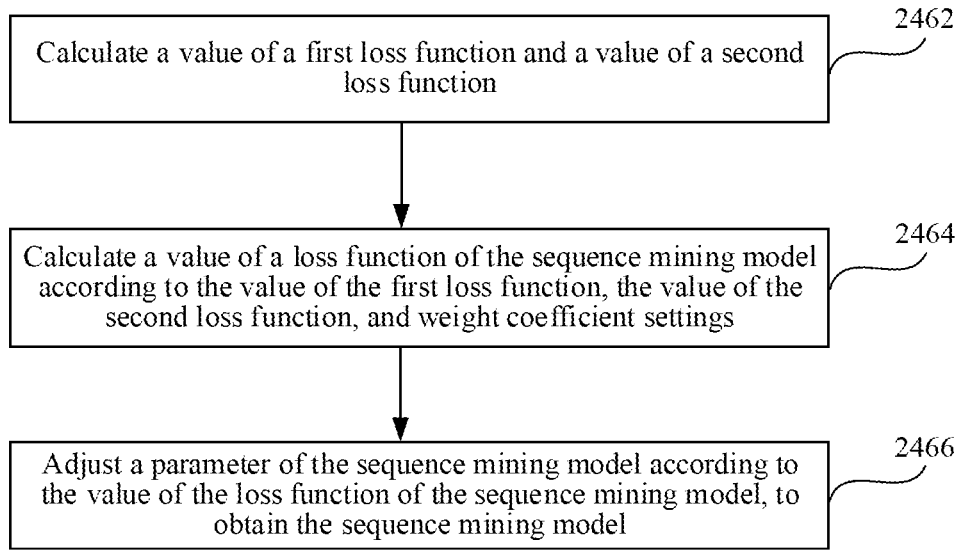
FIG. 7 is a flowchart of a joint training method according to an embodiment of one this application.

In an example, as shown in FIG. 7, step 246 includes the following substeps (2462 to 2466).

In step 2462, a value of a first loss function and a value of a second loss function are calculated.

The first loss function is a loss function of the first sub-model and the second loss function is a loss function of the second sub-model. For a specific calculation process of the value of the first loss function, reference is made to the exemplary embodiment shown in FIG. 5. Details are not described herein again. In some embodiments, the calculating a value of a second loss function includes the following steps.

(1) Determine k categories of the first sequence sample.

For a target service scenario, tag information of sequence data may be classified as a plurality of categories. A quantity k of categories of the first sequence sample may be determined according to the categories of the tag information, k being a positive integer. In some embodiments, the quantity of categories of the first sequence sample may be equal to a quantity of categories of the tag information. For example, in the target service scenario, tag information of sequence data has two categories "good" and "bad". Therefore, the computer device may determine, according to the categories of the tag information, that the first sequence sample may also be classified as two categories.

(2) Initialize k cluster centers by using the second sub-model and according to the k categories.

The computer device may initialize k cluster centers in the first sequence sample by using the second sub-model and according to the k categories, and then may update the cluster centers by using a k-means clustering algorithm. In this embodiment of this application, a parameter of the second sub-model is the cluster center, and a shape thereof may be represented as a parameter matrix [k, time_step2, 1].

(3) Calculate distances between the first sequence sample and the k cluster centers, to obtain a sample probability distribution.

The sample probability distribution is used for indicating probabilities that the first sequence sample respectively belongs to the k categories. After initializing the k cluster centers, the computer device may calculate a probability that each sequence sample in the first sequence sample belongs to the k cluster centers, that is, calculate distances between each sequence sample in the first sequence sample and the cluster centers. A probability distribution may be seen according to the calculated distances between the first sequence sample and the k cluster centers. In this embodiment of this application, the probability distribution is referred to as a sample probability distribution.

(4) Calculate a simulation sample probability distribution according to the sample probability distribution.

The simulation sample probability distribution is used for indicating that the probabilities that the first sequence sample respectively belongs to the k categories in a case that the first sequence sample has the tag information. When the first sequence sample has no tag information, the computer device cannot learn a real sample probability distribution. In this case, a simulation sample probability distribution may be obtained according to the sample probability distribution, and the simulation sample probability distribution is infinitely close to the real sample probability distribution. In some embodiments. an expression of the simulation sample probability distribution may be as follows:

$$p_{i,j} = \frac{q_{i,j}^2 / f_i}{\sum_{j=1}^{k} q_{i,j}^2 / f_i}, f_i = \sum_{i=1}^{n} q_i,$$

where $p_{i,j}$ represents a simulation probability that the $i^{th}$ sequence sample in the first sequence sample belongs to a $j^{th}$ cluster center, and all $p_{i,j}$ are combined to form a simulation sample probability distribution; $q_{i,j}$ represents a probability that the $i^{th}$ sequence sample in the first sequence sample belongs to the $j^{th}$ cluster center, and all $q_{i,j}$ are combined to form a sample probability distribution; and $f_i$ represents a sample probability distribution.

(5) Determine a relative entropy of the sample probability distribution and the simulation sample probability distribution as the value of the second loss function.

The relative entropy is also referred to as a kullback-leibler divergence (KLD), an information divergence, and an information gain and is an asymmetric measure of a difference between two probability distributions. In this embodiment of this application, the relative entropy of the sample probability distribution and the simulation sample probability distribution is used for measuring a quantity of extra bits required to encode a sample mean based on a sample probability distribution using an encoding based on a simulation sample probability distribution. The computer device uses the relative entropy of the sample probability distribution and the simulation sample probability distribution as the value of the second loss function. In some embodiments, an expression of the value of the second loss function is as follows:

$$\text{cluster\_loss} = \sum_{i=1}^{n} \sum_{j=1}^{k} p_{i,j} \log \frac{p_{i,j}}{q_{i,j}},$$

where cluster_loss represents the value of the second loss function.

In step 2464, a value of a loss function of the sequence mining model is calculated according to the value of the first loss function, the value of the second loss function, and weight coefficient settings.

The weight coefficient settings are settings of a weight of the first loss function and a weight of the second loss function. In some embodiments, the weight coefficient settings may be preset by the computer device or may be determined according to a target application scenario and an actual requirement in a loss function of the sequence mining model determining process. A determining occasion of the weight coefficient setting is not limited to the examples described in this application. The computer device may calculate a value of a loss function of the sequence mining model according to the value of the first loss function, the value of the second loss function, and the weight coefficient settings. In some embodiments, the value of the loss function of the sequence mining model may be represented as follows:

$$\text{loss}_{joint\ training} = r_1 * \text{ae\_loss} + r_2 * \text{cluster\_loss},$$

where $\text{loss}_{joint\ training}$ represents the value of the loss function of the sequence mining model, that is, the value of the loss function when the pre-trained first sub-model and the second sub-model are jointly trained; and $r_1$ and $r_2$ represent weight coefficient settings.

In step 2466, a parameter of the sequence mining model is adjusted according to the value of the loss function of the sequence mining model, to obtain the sequence mining model.

In this embodiment of this application, the computer device adjusts a parameter of the sequence mining model according to the value of the loss function of the sequence mining model, so that the loss function of the sequence mining model converges, to obtain the jointly trained sequence mining model.

Based on the foregoing, according to the technical solution provided in one or more embodiments of this application, in a case that a tag status is that a sequence sample has no tag information, it is determined that a sequence mining model includes a first sub-model and a second sub-model. In addition, in this embodiment of this application, when the sequence mining model is trained, the first sub-model is first trained (e.g., pre-training), to obtain a pre-trained first sub-model, and because a loss function of the pre-trained first sub-model converges, a latent representation of a sequence sample obtained by using the pre-trained first sub-model is relatively reliable. Subsequently, the pre-trained first sub-model and the second sub-model are jointly trained by using the sequence sample and the latent representation thereof, to obtain the sequence mining model, so that a specific training method of the sequence mining model when the sequence sample has no tag information is provided.

In addition, according to the technical solution provided in one or more embodiments of this application, a static feature of the sequence sample may be obtained, the static feature of the sequence sample is combined with the latent representation of the sequence sample, to obtain an optimized vector representation of the sequence sample, and then the pre-trained first sub-model and the second sub-model are jointly trained by using the sequence sample and the optimized vector representation thereof, to obtain the sequence mining model. Compared with the related art in which only sequence data of a sequence sample is considered and a static feature of the sequence sample is ignored, resulting in that static data has no action in a model training process and a trained model is insufficiently accurate, in the technical solution provided in this embodiment of this application, feature data of the sequence sample is fully considered, so that the static feature can also be applied to a model training process, to improve the accuracy of the sequence mining model and the data resource utilization.

In addition, according to the technical solution provided in one or more embodiments of this application, when the static feature and the latent representation of the sequence sample are combined, the static feature is regularized and the latent representation is generalized, so that the static feature and the latent representation has a same order of magnitude, to reduce the processing overheads when the computer device trains the sequence mining model by using the optimized vector representation and improve the calculation precision.

Figure 8:
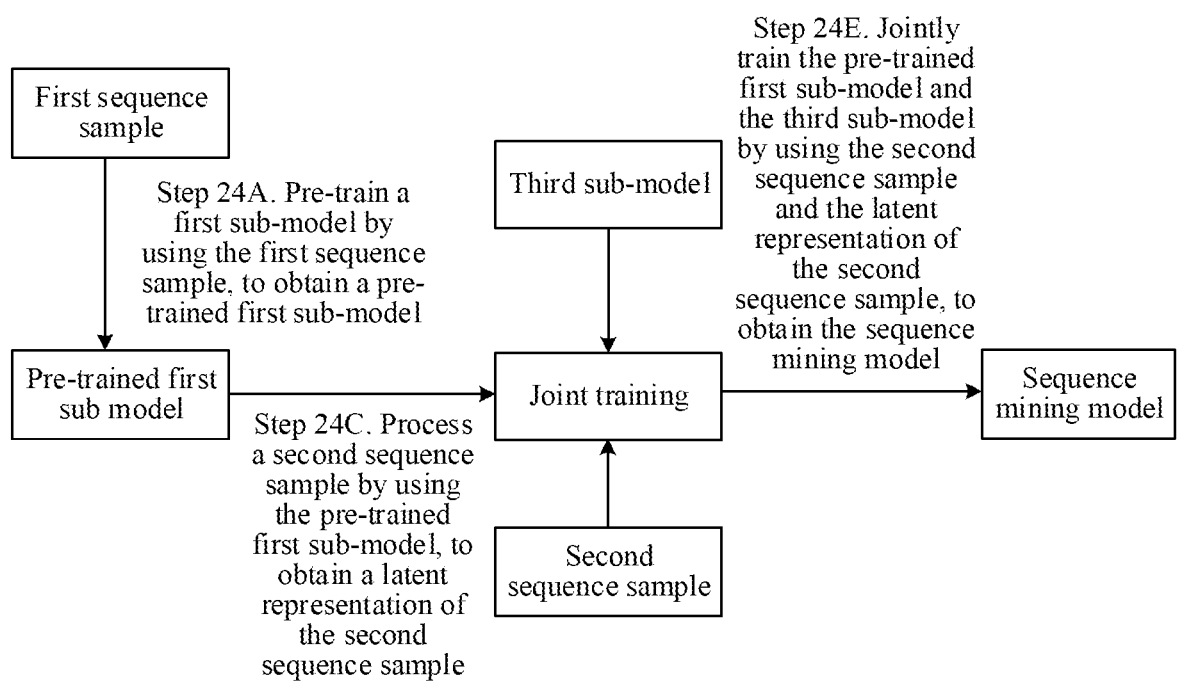
FIG. 8 is a flowchart of a method for training a sequence mining model according to still another embodiment of this application.

In another possible implementation, the tag status indicates that the first sequence sample at least partially has the tag information, and a quantity of second sequence samples is greater than a quantity of third sequence samples. The second sequence sample is a sequence sample with the tag information in the first sequence sample. The third sequence sample is a sequence sample without the tag information in the first sequence sample. The sequence mining model includes the first sub-model and the third sub-model. As shown in FIG. 8, step 240 includes the following substeps (24A to 24E).

In step 24A, a first sub-model is pre-trained by using the first sequence sample, to obtain a pre-trained first sub-model.

The detailed description of a pre-training process of the first sub-model may be similar to the embodiments advanced above. Details are not described herein again. In this embodiment of this application, the first sub-model may be pre-trained by using the second sequence sample or the third sequence sample, to obtain a pre-trained first sub-model, to improve a speed of pre-training the first sub-model by the computer device, thereby reducing the processing overheads of the computer device.

In step 24C, a second sequence sample is processed by using the pre-trained first sub-model, to obtain a latent representation of the second sequence sample.

Because there are a relatively large quantity of second sequence samples with the tag information in the first sequence sample, considering a training speed of the sequence mining model and the processing overheads of the computer device, a third sub-model may be trained, so that the tag information of the sequence data may be finally determined by using the third sub-model. In this embodiment of this application, the third sub-model is a model of determining tag information of sequence data by using a latent representation of the sequence data in a case that a sequence sample at least partially has the tag information, and the third sub-model is trained by using the second sequence sample, that is, the sequence sample with the tag information in the first sequence sample. In an exemplary application, the third sub-model may be implemented as a supervised learning model such as a classification model.

Existing classification models that can be implemented as the third sub-model may be used for processing two-dimensional sequence data. Therefore, after obtaining the pre-trained first sub-model, the computer device may process a second sequence sample by using the pre-trained first sub-model, to obtain a latent representation of the second sequence sample, so that during training of the third sub-model, the third sub-model is trained by using key feature information in the second sequence sample, to avoid training the third sub-model by using the three-dimensional second sequence sample. In some embodiments, an existing classifier may be used as the third sub-model, and the processing overheads when the computer device trains the third sub-model may be reduced.

In some embodiments, to improve the accuracy of the sequence mining model and the data resource utilization, after the obtaining, by the computer device, a latent representation of the second sequence sample, a static feature of the second sequence sample can be obtained, and an optimized vector representation of the second sequence sample can be obtained according to the static feature of the second sequence sample and the latent representation of the second sequence sample. The optimized vector representation of the second sequence sample can be used for jointly training the pre-trained first sub-model and the third sub-model. For detailed descriptions of the static feature of the second sequence sample and an obtaining process thereof and a calculation process of the optimized vector representation of the second sequence sample, reference can be made to the description of the static feature of the first sequence sample and the obtaining process thereof and the calculation process of the optimized vector representation of the first sequence sample as advanced above. Details are not described herein again.

In step 24E, the pre-trained first sub-model and the third sub-model are jointly trained by using the second sequence sample and the latent representation of the second sequence sample, to obtain the sequence mining model.

The computer device may jointly train the pre-trained first sub-model and the third sub-model by using the second sequence sample and the latent representation of the second sequence sample, that is, train the pre-trained first sub-model by using the second sequence sample and train the third sub-model by using the latent representation of the second sequence sample, to obtain the sequence mining model, the sequence mining model including the jointly trained first sub-model and the jointly trained third sub-model.

In an example, step 24E includes the following substeps: calculating a value of a first loss function and a value of a third loss function, the first loss function being a loss function of the first sub-model, and the third loss function being a loss function of the third sub-model; calculating a value of a loss function of the sequence mining model according to the value of the first loss function, the value of the third loss function, and weight coefficient settings, the weight coefficient settings being settings of a weight of the first loss function and a weight of the third loss function; and adjusting a parameter of the sequence mining model according to the value of the loss function of the sequence mining model, to obtain the sequence mining model. For a specific calculation process of the value of the first loss function, reference is made to the optional embodiment. Details are not described herein again.

For example, when the second sequence sample includes a sequence sample having positive tag information and a sequence sample having negative tag information, the third sub-model may be implemented as a standard classification model, so that the value of the third loss function may be calculated by using the following expression:

$$\text{classifier\_loss} = -[y * \log(p) + (1-y) * \log(1-p)],$$

where classifier_loss represents a value of a loss function of the third sub-model; y represents real tag information of the second sequence sample; and p represents a probability that the second sequence sample has prediction tag information.

A value of a loss function of the sequence mining model may be calculated according to the value of the first loss function and the value of the third loss function, which is as follows:

$$\text{loss}_{joint\ training} = r_{classifier} * \text{classifier\_loss} + r_{ae} * \text{ae\_loss},$$

where $\mathrm{loss}_{joint\ training}$ represents the value of the loss function of the sequence mining model, that is, the value of the loss function when the pre-trained first sub-model and the third sub-model are jointly trained; and $r_{classifier}$ and $r_{ae}$ represent weight coefficient settings.

For example, when the second sequence sample includes only the sequence sample having the positive tag information or includes only the sequence sample having the negative tag information, the existing standard classification model cannot process the latent representation of the second sequence sample. In this case, the third sub-model may be implemented as a PULearning model, and the value of the third loss function may be calculated by using the following expression:

$$\tilde{R}_{pu}(g) = \pi_p \hat{R}_p^+(g) + \max\{0, \hat{R}_u^-(g) - \pi_p \hat{R}_p^-(g)\} \text{ where}$$

$$\hat{R}_p^+(g) = \left(\frac{1}{n_p}\right)\sum_{i=1}^{n_p} l(g(x_i^p), 1),$$

$$\hat{R}_u^-(g) = \left(\frac{1}{n_u}\right)\sum_{i=1}^{n_u} l(g(x_{i=1}^u), -1), \text{ and}$$

$$\hat{R}_p^-(g) = \left(\frac{1}{n_p}\right)\sum_{i=1}^{n_p} l(g(x_{i=1}^p), -1),$$

where $\tilde{R}_{pu}$ represents the value of the third loss function; g is a decision function; $x^p$ represents the sequence sample having the positive tag information or the sequence sample having the negative tag information, that is, the second sequence sample; and $x^u$ represents a sequence sample without the tag information, that is, the third sequence sample.

A value of a loss function of the sequence mining model may be calculated according to the value of the first loss function and the value of the third loss function, which is as follows:

$$\mathrm{loss}_{joint\ training} = r_{pu} * \tilde{R}_{pu} + r_{ae} * \mathrm{ae\_loss},$$

where $\mathrm{loss}_{joint\ training}$ represents the value of the loss function of the sequence mining model, that is, the value of the loss function when the pre-trained first sub-model and the third sub-model are jointly trained; and $r_{pu}$ and $r_{ae}$ represent weight coefficient settings.

Based on the foregoing, according to the technical solution provided in one or more embodiments of this application, in a case that a tag status indicates that a sequence sample at least partially has tag information, and a quantity of sequence samples with the tag information is greater than a quantity of sequence samples without the tag information, it is determined that a sequence mining model includes a first sub-model and a third sub-model. In addition, in some embodiments of this application, when the sequence mining model is trained, the first sub-model is first trained, to obtain a pre-trained first sub-model, and because a loss function of the pre-trained first sub-model converges, a latent representation of a sequence sample obtained by using the pre-trained first sub-model is relatively reliable. Subsequently, the pre-trained first sub-model and the third sub-model are jointly trained by using the sequence sample with the tag information and a latent representation thereof, to obtain the sequence mining model, so that a specific training method of the sequence mining model when the sequence sample at least partially has the tag information is provided.

In addition, according to the technical solution provided in one or more embodiments of this application, when the sequence sample at least partially having the tag information includes a sequence sample with positive tag information and a sequence sample with negative tag information, it is proposed that the third sub-model is specifically implemented as a standard classification model. When the sequence sample at least partially having the tag information includes only the sequence sample with the positive tag information or includes only the sequence sample with the negative tag information, it is proposed that the third sub-model is specifically implemented as a PULearning model, so that a sequence mining model may be constructed for different tag statuses of sequence data in different service scenarios, to avoid unavailable of historical sequence data, thereby improve the data resource utilization and improving the accuracy of the sequence mining model.

Figure 9:
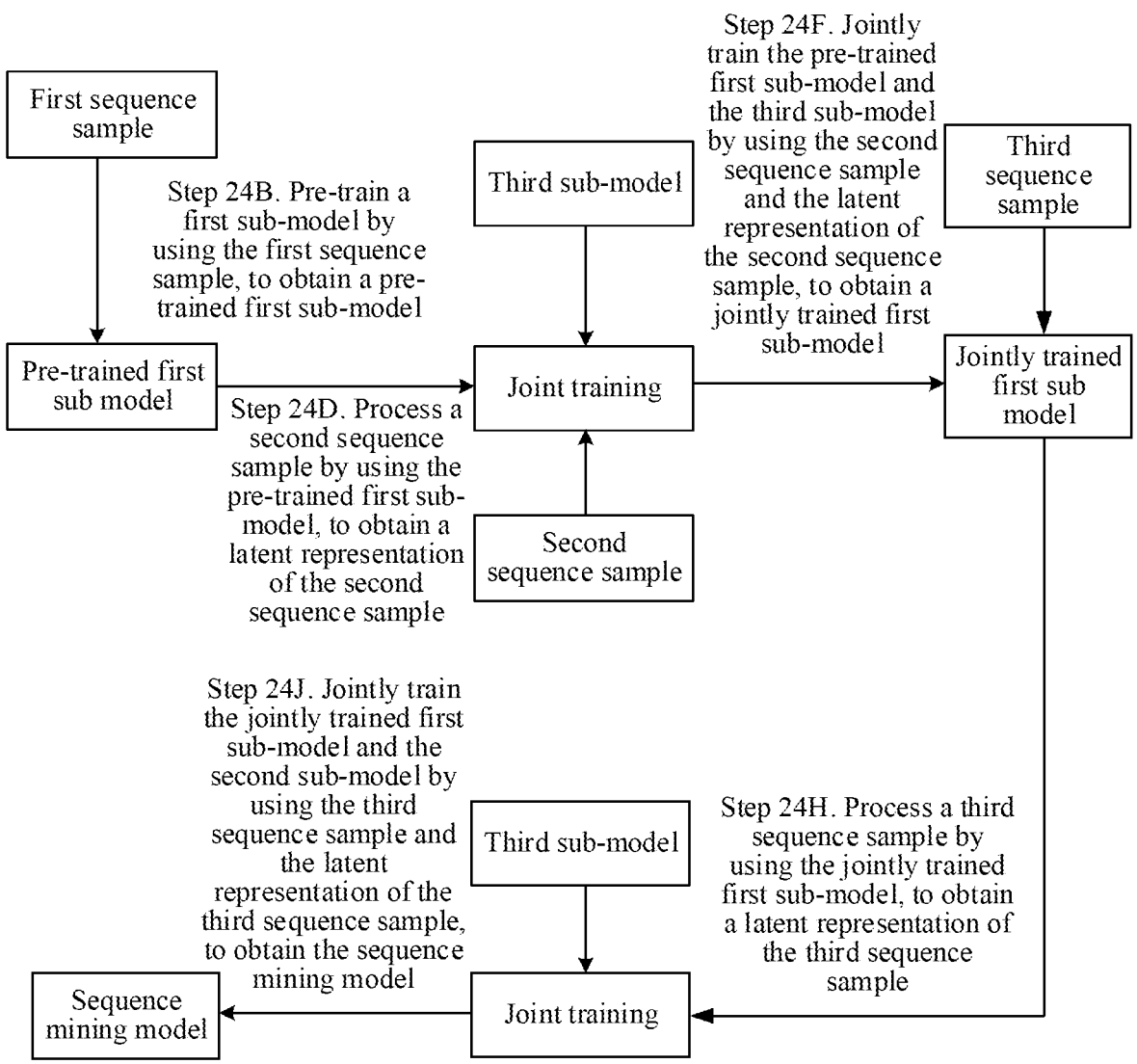
FIG. 9 is a flowchart of a method for training a sequence mining model according to yet another embodiment of this application.

In still another exemplary implementation, the tag status indicates that the first sequence sample at least partially has the tag information, and a quantity of second sequence samples is less than a quantity of third sequence samples. The second sequence sample is a sequence sample with the tag information in the first sequence sample. The third sequence sample is a sequence sample without the tag information in the first sequence sample. The sequence mining model includes the first sub-model, the second sub-model, and the third sub-model. As shown in FIG. 9, step 240 includes the following substeps (24B to 24J).

In step 24B, a first sub-model is pre-trained by using the first sequence sample, to obtain a pre-trained first sub-model.

For a detailed description of a pre-training process of the first sub-model, reference is made to the embodiments advanced above. Details are not described herein again. In this embodiment of this application, a first sub-model may be pre-trained by using the second sequence sample or the third sequence sample, to obtain a pre-trained first sub-model, to improve a speed of pre-training the first sub-model by the computer device, thereby reducing the processing overheads of the computer device.

In step 24D, a second sequence sample is processed by using the pre-trained first sub-model, to obtain a latent representation of the second sequence sample.

There can be a relatively large quantity of third sequence samples without tag information in the first sequence sample. In this case, if the second sequence sample with the tag information is directly used to train the third sub-model, and tag information of sequence data is finally determined by using the third sub-model, an inaccurate result of determining may be brought. Because there may be a relatively small quantity of sequence samples with the tag information, the trained third sub-model is insufficiently accurate. However, in this case, if the third sequence sample without the tag information is directly used to train the second sub-model, and the tag information of the sequence data is finally determined by using the second sub-model, the second sequence sample with the tag information is ignored, causing a waste of data sources and causing the second sub-model to be insufficiently accurate. Based on this, an embodiment of this application provides a solution in which the sequence mining model is constructed by using the first sub-model, the second sub-model, and the third sub-model and then the sub-models are respectively trained by using different sequence samples, which not only makes full use of data source, but also makes the trained sequence mining model more accurate.

Existing classification models that can be implemented as the third sub-model may be used for processing two-dimensional sequence data. Therefore, after obtaining the pre-trained first sub-model, the computer device may process a second sequence sample by using the pre-trained first sub-model, to obtain a latent representation of the second sequence sample, so that during joint training of the pre-trained first sub-model and the third sub-model, the third sub-model is trained by using key feature information in the second sequence sample, to avoid training the third sub-model by using the three-dimensional second sequence sample. In some embodiments, an existing classifier may be used as the third sub-model, and the processing overheads when the computer device trains the third sub-model may be reduced.

In some embodiments, to improve the accuracy of the sequence mining model and the data resource utilization, after the obtaining, by the computer device, a latent representation of the second sequence sample, the method further includes: obtaining a static feature of the second sequence sample; and obtaining an optimized vector representation of the second sequence sample according to the static feature of the second sequence sample and the latent representation of the second sequence sample, the optimized vector representation of the second sequence sample being used for jointly training the pre-trained first sub-model and the third sub-model. For detailed descriptions of the static feature of the second sequence sample and an obtaining process thereof and a calculation process of the optimized vector representation of the second sequence sample, reference is made to the description of the static feature of the first sequence sample and the obtaining process thereof and the calculation process of the optimized vector representation of the first sequence sample in the embodiments advanced above. Details are not described herein again.

In step 24F, the pre-trained first sub-model and the third sub-model are jointly trained by using the second sequence sample and the latent representation of the second sequence sample, to obtain a jointly trained first sub-model.

The computer device may jointly train the pre-trained first sub-model and the third sub-model by using the second sequence sample and the latent representation of the second sequence sample, that is, train the pre-trained first sub-model by using the second sequence sample and train the third sub-model by using the latent representation of the second sequence sample, to obtain the sequence mining model, the sequence mining model including the jointly trained first sub-model and the jointly trained third sub-model. Due to the joint training, tag information of a sequence sample is introduced into the jointly trained first sub-model, so that a latent representation of the sequence sample obtained by using the jointly trained first sub-model is more reliable.

In step 24H, a third sequence sample is processed by using the jointly trained first sub-model, to obtain a latent representation of the third sequence sample.

After obtaining the jointly trained first sub-model, the computer device may process a third sequence sample by using the jointly trained first sub-model, to obtain a latent representation of the third sequence sample. In some embodiments, to improve the accuracy of the sequence mining model and the data resource utilization, after the obtaining, by the computer device, a latent representation of the third sequence sample, the method further includes: obtaining a static feature of the third sequence sample; and obtaining an optimized vector representation of the third sequence sample according to the static feature of the third sequence sample and the latent representation of the third sequence sample, the optimized vector representation of the third sequence sample being used for jointly training the jointly trained first sub-model and the second sub-model. For detailed descriptions of the static feature of the third sequence sample and an obtaining process thereof and a calculation process of the optimized vector representation of the third sequence sample, reference is made to the description of the static feature of the first sequence sample and the obtaining process thereof and the calculation process of the optimized vector representation of the first sequence sample in the embodiments advanced above. Details are not described herein again.

In step 24J, the jointly trained first sub-model and the second sub-model are jointly trained by using the third sequence sample and the latent representation of the third sequence sample, to obtain the sequence mining model.

The computer device may jointly train the jointly trained first sub-model and the second sub-model by using the third sequence sample and the latent representation of the third sequence sample, that is, train the jointly trained first sub-model by using the third sequence sample and train the second sub-model by using the latent representation of the third sequence sample, to obtain the sequence mining model.

Based on the foregoing, according to the technical solution provided in one or more embodiments of this application, in a case that a tag status is that a sequence sample at least partially has tag information, and a quantity of sequence samples with the tag information is less than a quantity of sequence samples without the tag information, it is determined that a sequence mining model includes a first sub-model, a second sub-model, and a third sub-model. In addition, in one or more embodiments of this application, when the sequence mining model is trained, the first sub-model is first trained, to obtain a pre-trained first sub-model, and because a loss function of the pre-trained first sub-model converges, a latent representation of a sequence sample obtained by using the pre-trained first sub-model is relatively reliable. Subsequently, the pre-trained first sub-model and the third sub-model are jointly trained by using a sequence sample with tag information and a latent representation thereof, to obtain a jointly trained first sub-model. Because the tag information of the sequence sample is introduced into the jointly trained first sub-model, the latent representation of the sequence sample obtained by using the jointly trained first sub-model is more reliable. Finally, the jointly trained first sub-model and the second sub-model are jointly trained by using a sequence sample without the tag information and a latent representation thereof, to obtain a sequence mining model, so that a specific training method of the sequence mining model when the sequence sample at least partially has the tag information is provided. In addition, in the technical solution provided in this embodiment of this application, historical sequence data in a target service scenario is fully utilized. Compared with the related art in which only a part of historical sequence data is used for training a model, the technical solution provided in this embodiment of this application further improves the data resource utilization and makes the trained sequence mining model more accurate.

Figure 10:
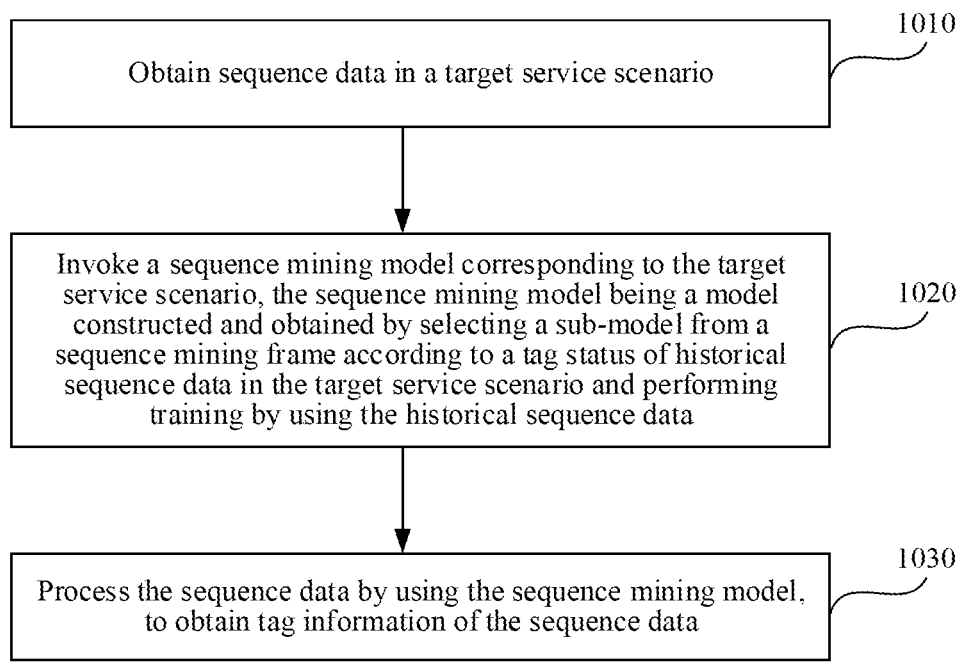
FIG. 10 is a flowchart of a method for processing sequence data according to an embodiment of this application.

FIG. 10 is a flowchart of a method for processing sequence data according to an embodiment of this application. The method is applicable to the computer device described above. The method may include the following steps (1010 to 1030).

In step 1010, sequence data is obtained in a target service scenario.

In step 1020, a sequence mining model corresponding to the target service scenario is invoked, the sequence mining model being a model constructed and obtained by selecting a sub-model from a sequence mining frame according to a tag status of a first sequence sample including historical sequence data in the target service scenario and performing training by using the first sequence sample.

In step 1030, the sequence data is processed by using the sequence mining model, to obtain tag information of the sequence data.

The sequence mining frame includes a first sub-model, a second sub-model, and a third sub-model. The first sub-model is configured to obtain a latent representation of the sequence data. The second sub-model is configured to determine tag information of the sequence data according to the latent representation of the sequence data in a case that a tag status meets a first condition, the first condition including that the tag status indicates that the first sequence sample has no tag information. The third sub-model is configured to determine the tag information of the sequence data according to the latent representation of the sequence data in a case that the tag status meets a second condition, the second condition including that the tag status indicates that the first sequence sample at least partially has the tag information.

For detailed descriptions of the target service scenario, the sequence data, the sequence mining frame, the sequence mining model, the tag information, and a training process of the sequence mining model, reference is made to the embodiments advanced. Details are not described herein again.

Based on the foregoing, according to the technical solution provided in one or more embodiments of this application, sequence data in a target service scenario is obtained, and then a sequence mining model corresponding to the target service scenario is invoked to process the sequence data, so as to determine tag information of the sequence data, which provides a manner of determining tag information of sequence data. In addition, according to the technical solution provided in one or more embodiments of this application, the sequence mining model is constructed by selecting a corresponding sub-model from a sequence mining frame according to a tag status of a first sequence sample including historical sequence data in the target service scenario, so that the sequence mining model may be consistent with the target service scenario, to improve the accuracy of determining the tag information of the sequence data. In addition, compared with the related art in which only a single sequence mining model is developed for a specific service scenario, the sequence mining frame provided in this embodiment of this application may be used for constructing sequence mining models with different compositions for different service scenarios and has relatively high universality.

Figure 11:
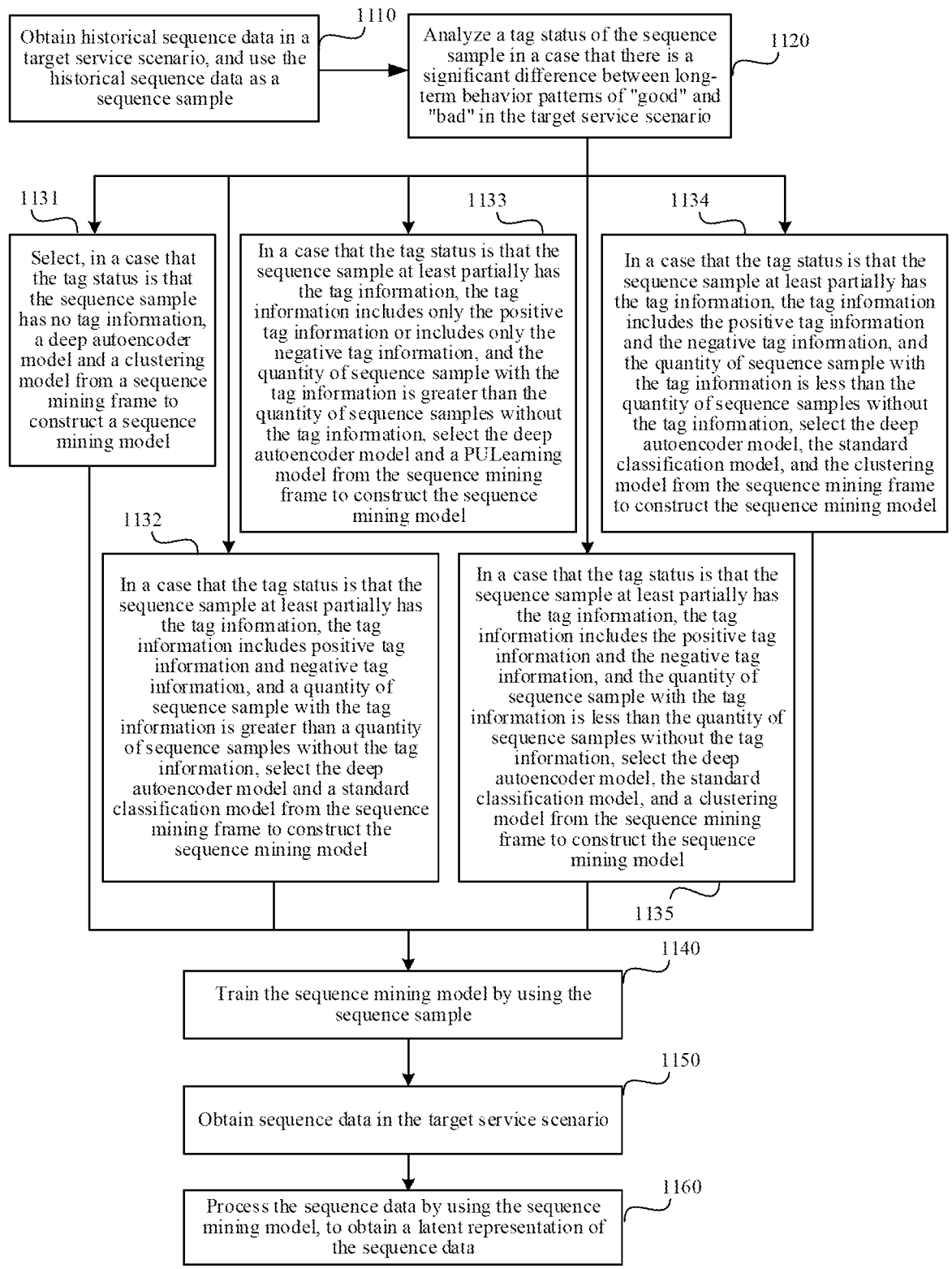
FIG. 11 is a flowchart of a method for training a sequence mining model and a method for processing sequence data according to an embodiment of this application.

FIG. 11 is a flowchart of a method for training a sequence mining model and a method for processing sequence data according to an embodiment of this application. The method is applicable to the computer device described above. The method may include the following steps.

In step 1110, historical sequence data in a target service scenario is obtained, and the historical sequence data is used as a sequence sample. The target service scenario is a service scenario that requires determination of tag information of sequence data in the service scenario. The sequence data, referred to as time sequence data, is data collected at different times in the target service scenario and is used for describing a condition that a phenomenon that occurs in the target service scenario changes over time.

In step 1120, a tag status of the sequence sample is analyzed in a case that there is a significant difference between long-term behavior patterns of "good" and "bad" in the target service scenario. The tag status of the sequence sample is used for indicating a proportion of the sequence sample that has corresponding tag information. The tag information is used for reflecting a feature attribute of the sequence sample. In some embodiments, the tag information may include two types of "good" and "bad", "good" meaning that it is consistent with a main service of the target service scenario, and "bad" meaning that it is deviated from the main service of the target service scenario.

Figure 12:
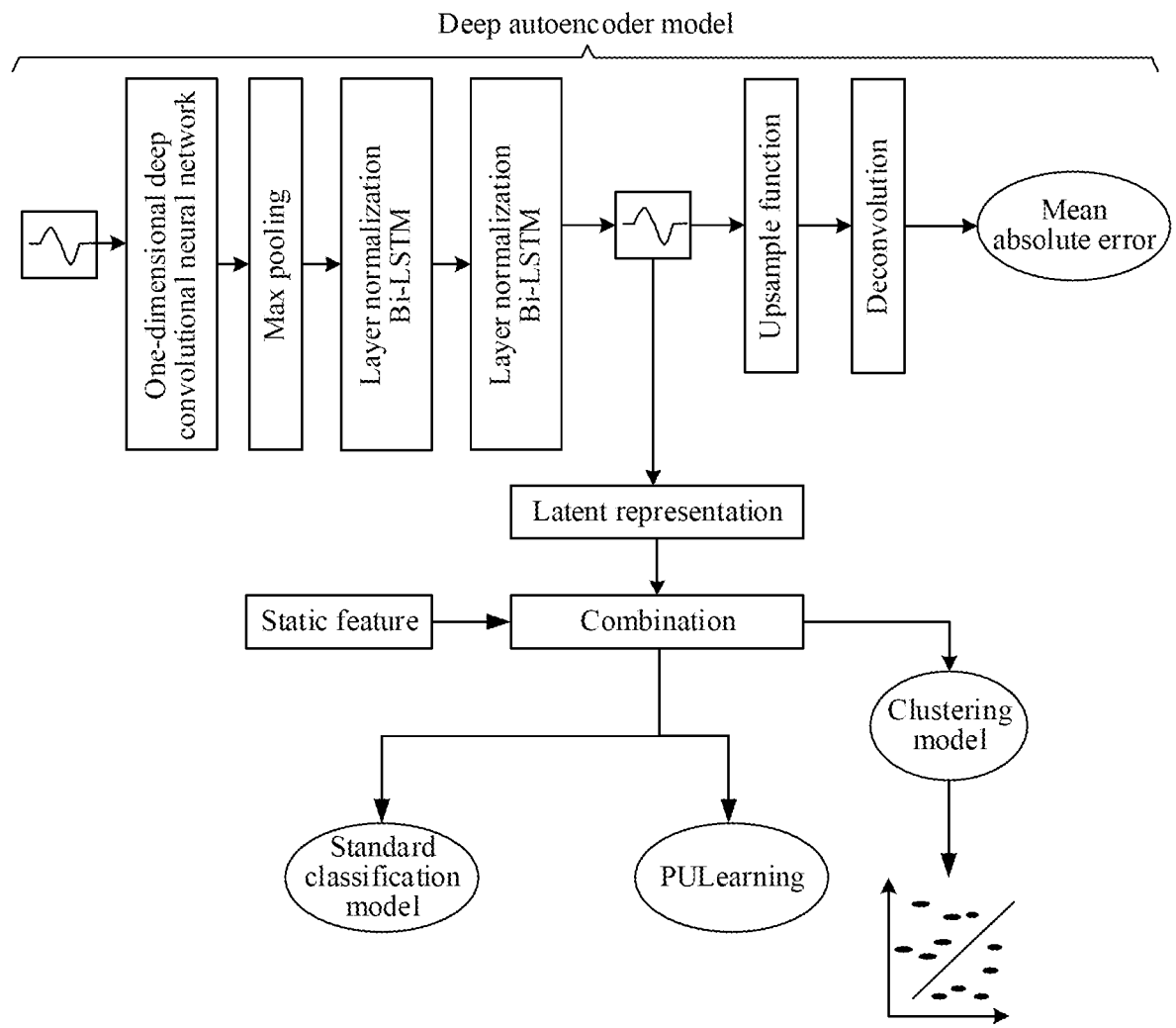
FIG. 12 is a schematic diagram of a sequence mining frame according to an embodiment of this application.

In step 1131, in a case that the tag status is that the sequence sample has no tag information, a deep autoencoder model and a clustering model is selected from a sequence mining frame to construct a sequence mining model. FIG. 12 is a schematic diagram of a sequence mining frame according to an embodiment of this application. The sequence mining frame includes a deep autoencoder model, a clustering model, a standard classification model, and a PULearning model. The computer device selects a deep autoencoder model and a clustering model from a sequence mining frame to construct a sequence mining model.

In step 1132, in a case that the tag status is that the sequence sample at least partially has the tag information, the tag information includes positive tag information and negative tag information, and a quantity of sequence sample with the tag information is greater than a quantity of sequence samples without the tag information, select the deep autoencoder model and a standard classification model from the sequence mining frame to construct the sequence mining model. The positive tag information corresponds to the foregoing "good", the negative tag information corresponds to the foregoing "bad". When the sequence sample with the tag information includes the sequence sample with the positive tag information and the sequence sample with the negative tag information, a classification model selected from the sequence mining frame by the computer device is the standard classification model.

In step 1133, in a case that the tag status is that the sequence sample at least partially has the tag information, the tag information includes only the positive tag information or includes only the negative tag information, and the quantity of sequence sample with the tag information is greater than the quantity of sequence samples without the tag information, select the deep autoencoder model and a PULearning model from the sequence mining frame to construct the sequence mining model. When the sequence sample with the tag information includes only the sequence sample with the positive tag information or includes only the sequence sample with the negative tag information, a classification model selected from the sequence mining frame by the computer device is a PULearning model.

In step 1134, in a case that the tag status is that the sequence sample at least partially has the tag information, the tag information includes the positive tag information and the negative tag information, and the quantity of sequence sample with the tag information is less than the quantity of sequence samples without the tag information, select the deep autoencoder model, the standard classification model, and the clustering model from the sequence mining frame to construct the sequence mining model. A quantity of sequence samples with the tag information is less than a quantity of sequence samples without the tag information, that is, the sequence sample includes a large quantity of sequence samples without tags. In this case, if a clustering model is directly used to perform unsupervised learning on the sequence sample, the sequence sample with the tag information is ignored, resulting in a waste of resources. Therefore, according to the technical solution provided in one or more embodiments of this application, a classification model is added to the sequence mining model, to make full use of the sequence sample, thereby improving the resource utilization and improving the accuracy of the sequence mining model.

In step 1135, in a case that the tag status is that the sequence sample at least partially has the tag information, the tag information includes only the positive tag information or includes only the negative tag information, and the quantity of sequence sample with the tag information is less than the quantity of sequence samples without the tag information, select the deep autoencoder model, the PULearning model, and the clustering model from the sequence mining frame to construct the sequence mining model.

In step 1140, the sequence mining model is trained by using the sequence sample. The sequence mining model may be used for determining tag information of sequence data in a target service scenario. The computer device may obtain a latent representation of a sequence sample by using the sequence sample and by using the deep autoencoder model, and then train the sequence mining model by using the sequence sample and the latent representation thereof. For a specific training process, reference is made to the embodiments advanced above.

In step 1150, sequence data (or target sequence data) in the target service scenario is obtained. New sequence data is continuously generated in the target service scenario. The computer device may obtain sequence data and then process the sequence data by using the sequence mining model.

In step 1160, the sequence data is processed by using the sequence mining model, to obtain a latent representation of the sequence data. The sequence mining model is obtained through training according to the historical sequence data in the target service scenario, and all the historical sequence data is fully utilized in the method for training a sequence mining model provided in this embodiment of this application, so that the trained sequence mining model highly matches the target service scenario, and tag information of sequence data determined by using the sequence mining model has relatively high accuracy.

Figure 13:
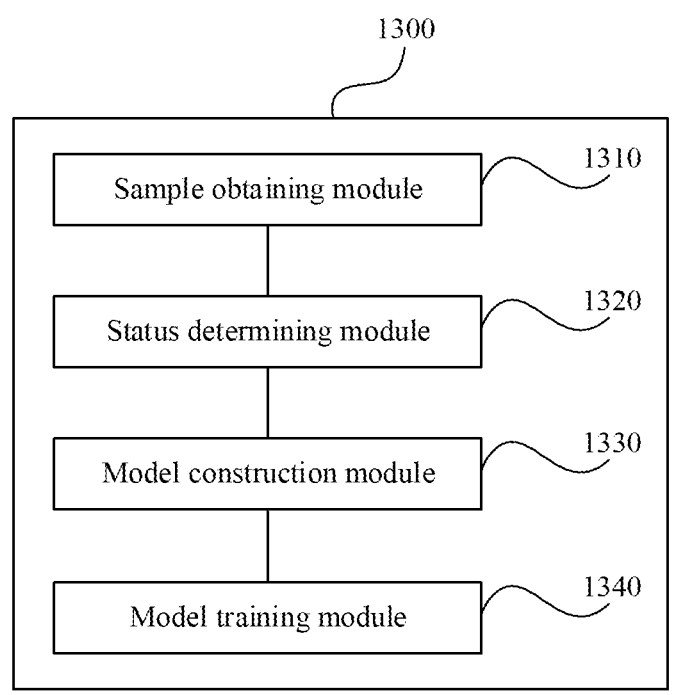
FIG. 13 is a block diagram of an apparatus for training a sequence mining model according to an embodiment of this application.

FIG. 13 is a block diagram of an apparatus 1300 for training a sequence mining model according to an embodiment of this application. The apparatus has functions of implementing the method for training a sequence mining model. The functions may be implemented by hardware, or may be implemented by hardware executing corresponding software. The apparatus may be a computer device, or may be disposed in a computer device. The apparatus 1300 may include: a sample obtaining module 1310, a status determining module 1320, a model construction module 1330, and a model training module 1340.

The sample obtaining module 1310 is configured to obtain a first sequence sample in a target service scenario, the first sequence sample including historical sequence data in the target service scenario.

The status determining module 1320 is configured to determine a tag status of the first sequence sample, the tag status of the first sequence sample being used for indicating a proportion of the first sequence sample that has corresponding tag information.

The model construction module 1330 is configured to select a sub-model from a sequence mining frame according to the tag status to construct a sequence mining model, the sequence mining model being configured to determine tag information of sequence data in the target service scenario.

The model training module 1340 is configured to train the sequence mining model by using the first sequence sample.

The sequence mining frame includes a first sub-model, a second sub-model, and a third sub-model. The first sub-model is configured to obtain a latent representation of the sequence data. The second sub-model is configured to determine tag information of the sequence data according to the latent representation of the sequence data in a case that the tag status meets a first condition, the first condition including that the tag status is that the first sequence sample has no tag information. The third sub-model is configured to determine the tag information of the sequence data according to the latent representation of the sequence data in a case that the tag status meets a second condition, the second condition including that the tag status is that the first sequence sample at least partially has the tag information.

Figure 14:
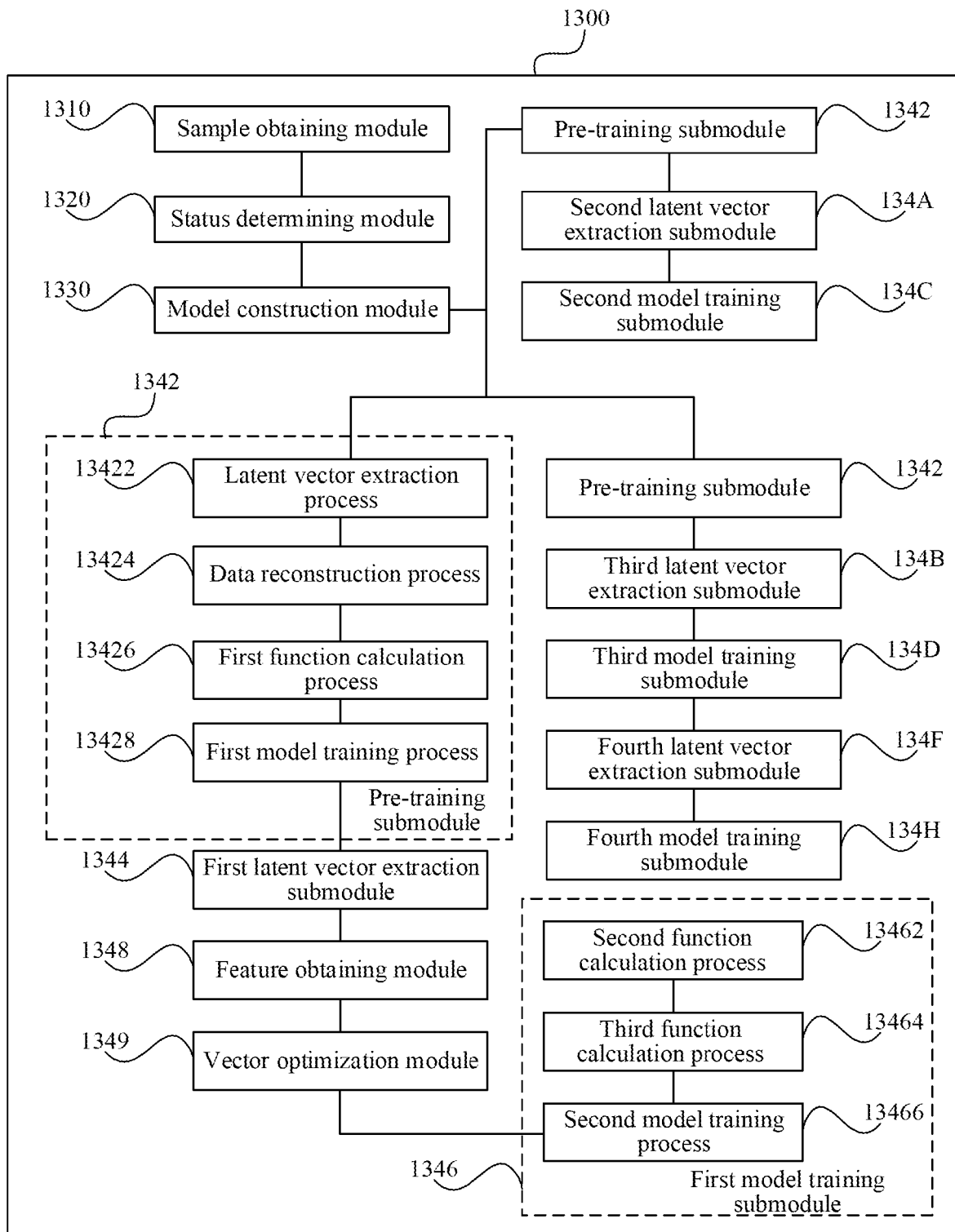
FIG. 14 is a block diagram of an apparatus for training a sequence mining model according to another embodiment of this application.

In some embodiments, the tag status indicates that the first sequence sample has no tag information, and the sequence mining model includes the first sub-model and the second sub-model. As shown in FIG. 14, the model training module includes: a pre-training submodule 1342, configured to perform pre-training of the first sub-model by using the first sequence sample, to obtain a pre-trained first sub-model; a first latent vector extraction submodule 1344, configured to process the first sequence sample by using the pre-trained first sub-model, to obtain a latent representation of the first sequence sample; and a first model training sub-module 1346, configured to jointly train the pre-trained first sub-model and the second sub-model by using the first sequence sample and the latent representation of the first sequence sample, to obtain the sequence mining model.

In some embodiments, the tag status indicates that the first sequence sample at least partially has the tag information, and a quantity of second sequence samples is greater than a quantity of third sequence samples. As shown in FIG. 14, the second sequence sample is a sequence sample with the tag information in the first sequence sample. The third sequence sample is a sequence sample without the tag information in the first sequence sample. The sequence mining model can include the first sub-model and the third sub-model. The model training module includes: a pre-training submodule 1342, configured to perform pre-training of the first sub-model by using the first sequence sample, to obtain a pre-trained first sub-model; a second latent vector extraction submodule 134A, configured to process the second sequence sample by using the pre-trained first sub-model, to obtain a latent representation of the second sequence sample; and a second model training submodule 134C, configured to jointly train the pre-trained first sub-model and the third sub-model by using the second sequence sample and the latent representation of the second sequence sample, to obtain the sequence mining model.

In some embodiments, the tag status indicates that the first sequence sample at least partially has the tag information, and the quantity of second sequence samples is less than the quantity of third sequence samples. The second sequence sample is a sequence sample with the tag information in the first sequence sample. The third sequence sample is a sequence sample without the tag information in the first sequence sample. The sequence mining model includes the first sub-model, the second sub-model, and the third sub-model. As shown in FIG. 14, the model training module can include: a pre-training submodule 1342, configured to perform pre-training of the first sub-model by using the first sequence sample, to obtain a pre-trained first sub-model; a third latent vector extraction submodule 134B, configured to process the second sequence sample by using the pre-trained first sub-model, to obtain a latent representation of the second sequence sample; a third model training submodule 134D, configured to jointly train the pre-trained first sub-model and the third sub-model by using the second sequence sample and the latent representation of the second sequence sample, to obtain a jointly trained first sub-model; a fourth latent vector extraction submodule 134F, configured to process the third sequence sample by using the jointly trained first sub-model, to obtain a latent representation of the third sequence sample; and a fourth model training submodule 134H, configured to jointly train the jointly trained first sub-model and the second sub-model by using the third sequence sample and the latent representation of the third sequence sample, to obtain the sequence mining model.

In some embodiments, the first sub-model includes a latent vector extraction process and a reconstruction process. As shown in FIG. 14, the pre-training submodule 1342 can include: a latent vector extraction process 13422, configured to process the first sequence sample by using the latent vector extraction process, to obtain the latent representation of the first sequence sample; a data reconstruction process 13424, configured to process the latent representation of the first sequence sample by using the reconstruction process, to obtain a reconstructed first sequence sample; a first function calculation process 13426, configured to calculate a value of a first loss function according to the first sequence sample and the reconstructed first sequence sample, the first loss function being a loss function corresponding to the first sub-model; and a first model training process 13428, configured to adjust a parameter of the first sub-model according to the value of the first loss function, to obtain the pre-trained first sub-model.

In some embodiments, the latent vector extraction process includes a mapping sub-process, a dimension reduction sub-process, and a recursion sub-process. As shown in FIG. 14, the latent vector extraction process 13422 is configured to obtain feature information of the first sequence sample by using the mapping sub-process, to obtain a feature information representation of the first sequence sample; perform dimension reduction on the feature information of the first sequence sample by using the dimension reduction sub-process, to obtain dimension-reduction feature information of the first sequence sample; and learn a change rule of a step length between sequences of the dimension-reduction feature information of the first sequence sample by using the recursion sub-process, to obtain the latent representation of the first sequence sample.

In some embodiments, as shown in FIG. 14, the apparatus 1300 can further include: a feature obtaining module 1348, configured to obtain a static feature of the first sequence sample; and a vector optimization module 1349, configured to obtain an optimized vector representation of the first sequence sample according to the static feature of the first sequence sample and the latent representation of the first sequence sample, the optimized vector representation of the first sequence sample being used for jointly training the pre-trained first sub-model and the second sub-model.

In some embodiments, as shown in FIG. 14, the vector optimization module 1349 is configured to regularize the static feature of the first sequence sample, to obtain a regularized static feature; generalize the latent representation of the first sequence sample, to obtain a generalized latent representation; and obtain the optimized vector representation of the first sequence sample according to the regularized static feature and the generalized latent representation.

In some embodiments, as shown in FIG. 14, the first model training submodule 1346 can include: a second function calculation process 13462, configured to calculate the value of the first loss function and a value of a second loss function, the first loss function being a loss function of the first sub-model, and the second loss function being a loss function of the second sub-model; a third function calculation process 13464, configured to calculate a value of a loss function of the sequence mining model according to the value of the first loss function, the value of the second loss function, and weight coefficient settings, the weight coefficient settings being settings of a weight of the first loss function and a weight of the second loss function; and a second model training process 13466, configured to adjust a parameter of the sequence mining model according to the value of the loss function of the sequence mining model, to obtain the sequence mining model.

In some embodiments, as shown in FIG. 14, the second function calculation process 13462 is configured to determine k categories of the first sequence sample, k being a positive integer; initialize k cluster centers by using the second sub-model and according to the k categories; calculate distances between the first sequence sample and the k cluster centers, to obtain a sample probability distribution, the sample probability distribution being used for indicating probabilities that the first sequence sample respectively belongs to the k categories; calculate a simulation sample probability distribution according to the sample probability distribution, the simulation sample probability distribution being used for indicating the probabilities that the first sequence sample respectively belongs to the k categories in a case that the first sequence sample has the tag information; and determine a relative entropy of the sample probability distribution and the simulation sample probability distribution as the value of the second loss function.

Based on the foregoing, according to the technical solution provided in one or more embodiments of this application, a sequence mining frame is provided. In an exemplary application, a sequence sample in a target service scenario is obtained, a sub-model is selected from the sequence mining frame according to a tag status of the sequence sample to construct a sequence mining model, and then the sequence mining model is trained by using the sequence sample, so that the trained sequence mining model may be used for determining tag information of sequence data in the target service scenario. In addition, the sequence mining frame provided in this embodiment of this application may be universal in different service scenarios. The sequence mining frame includes at least one sub-model, and a corresponding sub-model may be selected from the sequence mining frame for different tag statuses of historical sequence data in different service scenarios, to construct the sequence mining model. In addition, compared with the related art in which only a single model with a fixed structure can be used for training, causing a part of historical sequence data in a service scenario to be unavailable for training. For example, in the related art, only a non-supervised clustering model can be used for training, causing historical sequence data having tag information in a service scenario to be unavailable for training, resulting in a waste of resources. According to the technical solution provided in one or more embodiments of this application, different sub-models may be used for training for different tag statuses of historical sequence data, to make full use of all historical sequence data in a service scenario, thereby improving the resource utilization. In addition, in the technical solution provided in this embodiment of this application, the sequence mining model may be fully trained by using all the historical sequence data in the target service scenario, to improve the accuracy of determining the tag information of the sequence data by using the sequence mining model.

Figure 15:
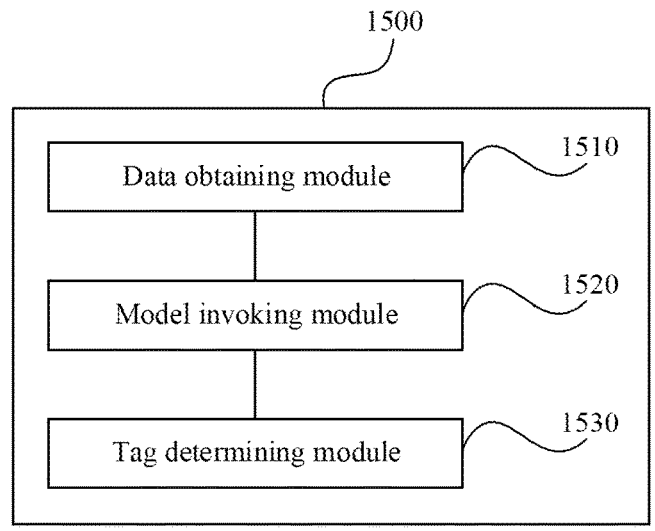
FIG. 15 is a block diagram of an apparatus for processing sequence data according to an embodiment of this application.

FIG. 15 is a block diagram of an apparatus 1500 for processing sequence data according to an embodiment of this application. The apparatus has functions of implementing the method for processing sequence data. The functions may be implemented by hardware, or may be implemented by hardware executing corresponding software. The apparatus may be a computer device, or may be disposed in a computer device. The apparatus 1500 may include a data obtaining module 1510, a model invoking module 1520, and a tag determining module 1530.

The data obtaining module 1510 is configured to obtain sequence data in a target service scenario.

The model invoking module 1520 is configured to invoke a sequence mining model corresponding to the target service scenario, the sequence mining model being a model obtained by selecting a sub-model from a sequence mining frame for construction according to a tag status of historical sequence data in the target service scenario and performing training by using the historical sequence data.

The tag determining module 1530 is configured to process the sequence data by using the sequence mining model, to obtain tag information of the sequence data.

The sequence mining frame includes a first sub-model, a second sub-model, and a third sub-model. The first sub-model is configured to obtain a latent representation of the sequence data. The second sub-model is configured to determine tag information of the sequence data according to the latent representation of the sequence data in a case that the tag status meets a first condition, the first condition including that the tag status is that the first sequence sample has no tag information. The third sub-model is configured to determine the tag information of the sequence data according to the latent representation of the sequence data in a case that the tag status meets a second condition, the second condition including that the tag status is that the first sequence sample at least partially has the tag information.

Based on the foregoing, according to the technical solution provided in one or more embodiments of this application, sequence data in a target service scenario is obtained, and then a sequence mining model corresponding to the target service scenario is invoked to process the sequence data, so as to determine tag information of the sequence data, which provides a manner of determining tag information of sequence data. In addition, according to the technical solution provided in one or more embodiments of this application, the sequence mining model is constructed by selecting a corresponding sub-model from a sequence mining frame according to a tag status of historical sequence data in the target service scenario, so that the sequence mining model may be consistent with the target service scenario, to improve the accuracy of determining the tag information of the sequence data. In addition, compared with the related art in which only a single sequence mining model is developed for a specific service scenario, the sequence mining frame provided in this embodiment of this application may be used for constructing sequence mining models with different compositions for different service scenarios and has relatively high universality.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments correspond to the same concept. For the specific implementation process, reference may be made to the method embodiments, and details are not described herein again. Of course, it should be understood that one or more of the modules described in this disclosure can be implemented by hardware, for example, circuitry.

Figure 16:
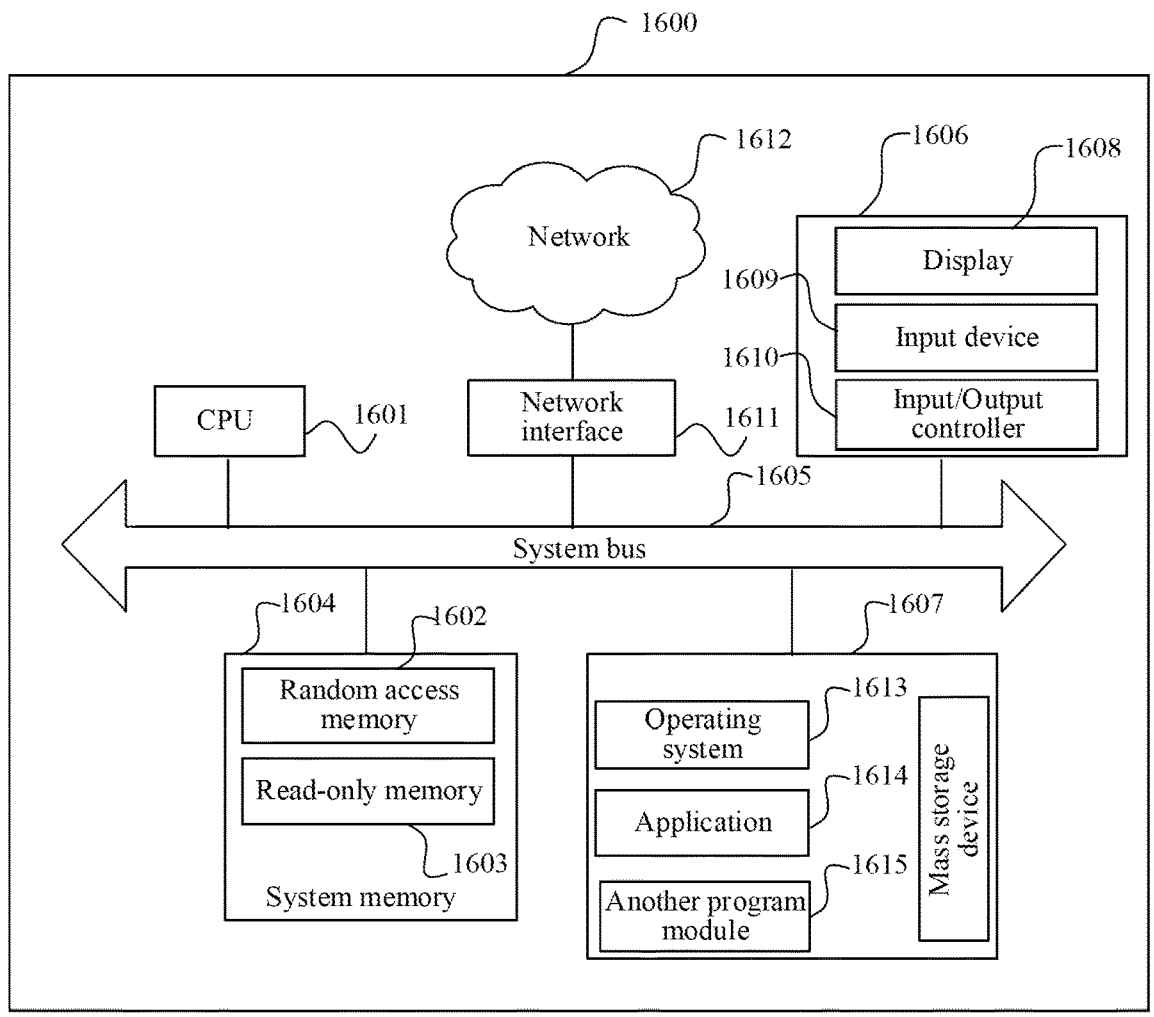
FIG. 16 is a structural block diagram of a computer device according to an embodiment of this application.

FIG. 16 is a structural block diagram of a computer device according to an embodiment of this application. The computer device may be configured to implement functions of the examples of the method for training a sequence mining model or the examples of the method for processing sequence data.

In some embodiments, the computer device 1600 includes a central processing unit (CPU) 1601 such as a graphics processing unit (GPU) and a field programmable logic array (FPGA), a system memory 1604 including a random access memory (RAM) 1602 and a random-only memory (ROM) 1603, and a system bus 1605 connecting the system memory 1604 to the CPU 1601. The computer device 1600 further includes a basic input/output (I/O) system 1606 assisting in transmitting information between devices in the computer device and a mass storage device 1607 configured to store an operating system 1613, an application program 1614, and another program module 1615.

The basic I/O system 1606 includes a display 1608 configured to display information and an input device 1609 such as a mouse or a keyboard configured to input information by a user. The display 1608 and the input device 1609 are both connected to the CPU 1601 by using an input/output controller 1610 connected to the system bus 1605. The basic I/O system 1606 may further include the I/O controller 1610 configured to receive and process inputs from a plurality of other devices such as a keyboard, a mouse, or an electronic stylus. Similarly, the I/O controller 1610 further provides an output to a display screen, a printer, or another type of output device.

The mass storage device 1607 is connected to the CPU 1601 by using a mass storage controller (not shown) connected to the system bus 1605. The mass storage device 1607 and an associated computer-readable medium provide storage for the computer device 1600. That is, the mass storage device 1607 may include a computer-readable medium (not shown) such as a hard disk or a compact disc ROM (CD-ROM) drive.

The computer storage medium may include a RAM, a ROM, an erasable programmable ROM (EPROM), an electrically erasable programmable ROM (EEPROM), a flash memory or another solid-state memory technology, a CD-ROM, a digital versatile disc (DVD) or another optical writing a tape cartridge, a magnetic cassette, a magnetic disk memory, or another magnetic storage device. The RAM may include a resistance random access memory (ReRAM) and a dynamic random access memory (DRAM). Certainly, a person skilled in the art can know that the computer storage medium is not limited to the foregoing several types. The system memory 1604 and the mass storage device 1607 may be collectively referred to as a memory.

According to the embodiments of this application, the computer device 1600 may be further connected, through a network such as the Internet, to a remote computer on the network and run. That is, the computer device 1600 may be connected to a network 1612 by using a network interface 1611 connected to the system bus 1605, or may be connected to another type of network or a remote computer system (not shown) by using a network interface 1611.

The memory includes non-transitory computer-readable medium storing at least one instruction, at least one program, a code set, or an instruction set. The at least one instruction, the at least one program, the code set, or the instruction set is stored in the non-transitory computer-readable medium and is configured to be executed by one or more processors to implement the method for training a sequence mining model or the method for processing sequence data.

An exemplarily embodiment further provides a non-transitory computer-readable storage medium, storing at least one instruction, at least one program, a code set, or an instruction set, and the at least one instruction, the at least one program, the code set, or the instruction set being loaded and executed by a processor to implement the method for training a sequence mining model or the method for processing the sequence data.

An exemplarily embodiment further provides a computer program product, the computer program product, when run on a computer device, causing the computer device to perform the method for training a sequence mining model or perform the method for processing sequence data.

It is to be understood that "plurality of" mentioned in this specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A computer-implemented method for training a sequence mining model, the method comprising:
   obtaining, by processing circuitry of a computer device, a first sequence sample in a target service scenario, the first sequence sample comprising historical sequence data in the target service scenario;
   determining, by the processing circuitry of the computer device, a tag status of the first sequence sample, the tag status of the first sequence sample indicating a proportion of the first sequence sample that has corresponding tag information;
   selecting, by the processing circuitry of the computer device, at least a sub-model from a plurality of sub-models included in a sequence mining frame according to the tag status, to construct the sequence mining model, the plurality of sub-models including:
   a first sub-model configured to generate a latent representation of target sequence data of the first sequence sample,
   a second sub-model configured to determine target tag information of the target sequence data based on the latent representation when the tag status indicates that the first sequence sample has no tag information, and
   a third sub-model configured to determine the target tag information based on the latent representation when the tag status indicates that the first sequence sample at least partially has tag information; and
   training, by the processing circuitry of the computer device, the constructed sequence mining model by using the first sequence sample, wherein
   the training the sequence mining model comprises:
   performing pre-training of the first sub-model by using the first sequence sample, to obtain a pre-trained first sub-model,
   processing the first sequence sample by using the pre-trained first sub-model, to obtain a latent representation of the first sequence sample, and
   jointly training the pre-trained first sub-model and at least one of the second sub-model or the third sub-model by using the first sequence sample and the latent representation of the first sequence sample, to obtain the sequence mining model; and
   the trained sequence mining model is configured to determine target tag information of target sequence data in the target service scenario.

2. The method according to claim 1, wherein
the tag status indicates that the first sequence sample has no tag information,
the sequence mining model comprises the first sub-model and the second sub-model, and
the jointly training comprises jointly training the pre-trained first sub-model and the second sub-model by using the first sequence sample and the latent representation of the first sequence sample, to obtain the sequence mining model.

3. The method according to claim 1, wherein
the tag status indicates that the first sequence sample at least partially has the tag information, and a quantity of second sequence sample is greater than a quantity of third sequence sample, the second sequence sample being a portion of the first sequence sample having the tag information, and the third sequence sample being a portion of the first sequence sample without the tag information,
the sequence mining model comprises the first sub-model and the third sub-model, and
the jointly training comprises jointly training the pre-trained first sub-model and the third sub-model by using the second sequence sample and the latent representation of the second sequence sample, to obtain the sequence mining model.

4. The method according to claim 1, wherein
the tag status indicates that the first sequence sample at least partially has the tag information, and a quantity of second sequence sample is less than a quantity of third sequence sample, the second sequence sample being a portion of the first sequence sample having the tag information, and the third sequence sample being a portion of the first sequence sample without the tag information, the sequence mining model comprises the first sub-model, the second sub-model, and the third sub-model, and
the jointly training comprises:
jointly training the pre-trained first sub-model and the third sub-model with the second sequence sample and the latent representation of the second sequence sample, to obtain a jointly trained first sub-model; and
jointly training the jointly trained first sub-model and the second sub-model with the third sequence sample and the latent representation of the third sequence sample, to obtain the sequence mining model.

5. The method according to claim 2, wherein
the first sub-model comprises a latent vector extraction process and a reconstruction process, and
the performing the pre-training of the first sub-model comprises:
processing the first sequence sample by using the latent vector extraction process, to obtain the latent representation of the first sequence sample;
processing the latent representation of the first sequence sample by using the reconstruction process, to obtain a reconstructed first sequence sample;
calculating a value of a first loss function according to the first sequence sample and the reconstructed first sequence sample, the first loss function being a loss function corresponding to the first sub-model; and
adjusting a parameter of the first sub-model according to the value of the first loss function, to obtain the pre-trained first sub-model.

6. The method according to claim 5, wherein
the latent vector extraction process comprises a mapping sub-process, a dimension reduction sub-process, and a recursion sub-process, and
the processing the first sequence sample by using the latent vector extraction process, to obtain the latent representation of the first sequence sample comprises:
obtaining feature information of the first sequence sample by using the mapping sub-process, to obtain a feature information representation of the first sequence sample;
performing dimension reduction on the feature information of the first sequence sample by using the dimension reduction sub-process, to obtain dimension-reduction feature information of the first sequence sample; and
learning a change rule of a step length between sequences of the dimension-reduction feature information of the first sequence sample by using the recursion sub-process, to obtain the latent representation of the first sequence sample.

7. The method according to claim 2, wherein
after the processing the first sequence sample by using the pre-trained first sub-model, to obtain the latent representation of the first sequence sample, the method further comprises:
obtaining a static feature of the first sequence sample; and
obtaining an optimized vector representation of the first sequence sample according to the static feature of the first sequence sample and the latent representation of the first sequence sample, and
the jointly training comprises jointly training the pre-trained first sub-model and the second sub-model based on the optimized vector representation of the first sequence sample.

8. The method according to claim 7, wherein the obtaining the optimized vector representation of the first sequence sample according to the static feature of the first sequence sample and the latent representation of the first sequence sample comprises:
regularizing the static feature of the first sequence sample, to obtain a regularized static feature;
generalizing the latent representation of the first sequence sample, to obtain a generalized latent representation; and
obtaining the optimized vector representation of the first sequence sample according to the regularized static feature and the generalized latent representation.

9. The method according to claim 2, wherein the jointly training the pre-trained first sub-model and the second sub-model by using the first sequence sample and the latent representation of the first sequence sample, to obtain the sequence mining model comprises:
calculating a value of a first loss function and a value of a second loss function, the first loss function being a loss function of the first sub-model, and the second loss function being a loss function of the second sub-model;
calculating a value of a loss function of the sequence mining model according to the value of the first loss function, the value of the second loss function, and weight coefficient settings, the weight coefficient settings being settings of a weight of the first loss function and a weight of the second loss function; and
adjusting a parameter of the sequence mining model according to the value of the loss function of the sequence mining model, to obtain the sequence mining model.

10. The method according to claim 9, wherein the calculating the value of the second loss function comprises:
identifying k categories of the first sequence sample, k being a positive integer;
initializing k cluster centers by using the second sub-model and according to the k categories;
calculating distances between the first sequence sample and the k cluster centers, to obtain a sample probability distribution, the sample probability distribution being used for indicating probabilities that the first sequence sample respectively belongs to the k categories;
calculating a simulation sample probability distribution according to the sample probability distribution, the simulation sample probability distribution being used for indicating the probabilities that the first sequence sample respectively belongs to the k categories in a case that the first sequence sample has the tag information; and
determining a relative entropy of the sample probability distribution and the simulation sample probability distribution as the value of the second loss function.

11. An apparatus for training a sequence mining model, comprising:
processing circuitry configured to:
obtain a first sequence sample in a target service scenario, the first sequence sample comprising historical sequence data in the target service scenario;
determine a tag status of the first sequence sample, the tag status of the first sequence sample indicating a proportion of the first sequence sample that has corresponding tag information;
select at least a sub-model from a plurality of sub-models included in a sequence mining frame according to the tag status, to construct the sequence mining model, the plurality of sub-models including:

a first sub-model configured to generate a latent representation of target sequence data of the first sequence sample, a second sub-model configured to determine target tag information of the target sequence data based on the latent representation when the tag status indicates that the first sequence sample has no tag information, and a third sub-model configured to determine the target tag information based on the latent representation when the tag status indicates that the first sequence sample at least partially has tag information; and train the constructed sequence mining model by using the first sequence sample, wherein to train the constructed sequence mining model, pre-training of the first sub-model is performed by using the first sequence sample, to obtain a pre-trained first sub-model, the first sequence sample is processed by using the pre-trained first sub-model, to obtain a latent representation of the first sequence sample, the pre-trained first sub-model and at least one of the second sub-model or the third sub-model is jointly trained by using the first sequence sample and the latent representation of the first sequence sample, to obtain the sequence mining model, and the trained sequence mining model is configured to determine target tag information of target sequence data in the target service scenario.

12. The apparatus according to claim 11, wherein
the tag status indicates that the first sequence sample has no tag information,
the sequence mining model comprises the first sub-model and the second sub-model, and
the processing circuitry is configured to:
perform the joint training of the pre-trained first sub-model and the second sub-model by using the first sequence sample and the latent representation of the first sequence sample, to obtain the sequence mining model.

13. The apparatus according to claim 11, wherein
the tag status indicates that the first sequence sample at least partially has the tag information, and a quantity of second sequence sample is greater than a quantity of third sequence sample, the second sequence sample being a portion of the first sequence sample having the tag information, and the third sequence sample being a portion of the first sequence sample without the tag information,
the sequence mining model comprises the first sub-model and the third sub-model, and
the processing circuitry is further configured to:
perform the joint training of the pre-trained first sub-model and the third sub-model by using the second sequence sample and the latent representation of the second sequence sample, to obtain the sequence mining model.

14. The apparatus according to claim 11, wherein
the tag status indicates that the first sequence sample at least partially has the tag information, and a quantity of second sequence sample is less than a quantity of third sequence sample, the second sequence sample being a portion of the first sequence sample having the tag information, and the third sequence sample being a portion of the first sequence sample without the target tag information, the sequence mining model comprises the first sub-model, the second sub-model, and the third sub-model, and
the processing circuitry is further configured to:
jointly train the pre-trained first sub-model and the third sub-model by using the second sequence sample and the latent representation of the second sequence sample, to obtain a jointly trained first sub-model; and
jointly train the jointly trained first sub-model and the second sub-model by using the third sequence sample and the latent representation of the third sequence sample, to obtain the sequence mining model.

15. The apparatus according to claim 12, wherein
the first sub-model comprises a latent vector extraction process and a reconstruction process, and
the processing circuitry is further configured to perform the pre-training of the first sub-model by performing:
processing of the first sequence sample by using the latent vector extraction process, to obtain the latent representation of the first sequence sample;
processing of the latent representation of the first sequence sample by using the reconstruction process, to obtain a reconstructed first sequence sample;
calculation of a value of a first loss function according to the first sequence sample and the reconstructed first sequence sample, the first loss function being a loss function corresponding to the first sub-model; and
adjustment of a parameter of the first sub-model according to the value of the first loss function, to obtain the pre-trained first sub-model.

16. A non-transitory computer-readable storage medium storing instructions which when executed by a processor cause the processor to perform:
obtaining a first sequence sample in a target service scenario, the first sequence sample comprising historical sequence data in the target service scenario;
determining a tag status of the first sequence sample, the tag status of the first sequence sample indicating a proportion of the first sequence sample that has corresponding tag information;
selecting at least a sub-model from a plurality of sub-models included in a sequence mining frame according to the tag status, to construct a sequence mining model, the plurality of sub-models including:
a first sub-model configured to generate a latent representation of target sequence data of the first sequence sample,
a second sub-model configured to determine target tag information of the target sequence data based on the latent representation when the tag status indicates that the first sequence sample has no tag information, and
a third sub-model configured to determine the target tag information based on the latent representation when the tag status indicates that the first sequence sample at least partially has tag information; and
training the constructed sequence mining model by using the first sequence sample, wherein
the training the sequence mining model comprises:
performing pre-training of the first sub-model by using the first sequence sample, to obtain a pre-trained first sub-model,
processing the first sequence sample by using the pre-trained first sub-model, to obtain a latent representation of the first sequence sample, and jointly training the pre-trained first sub-model and at least one of the second sub-model or the third sub-model by using the first sequence sample and the latent representation of the first sequence sample, to obtain the sequence mining model; and the trained sequence mining model is configured to determine target tag information of target sequence data in the target service scenario.

17. The non-transitory computer-readable storage medium according to claim 16, wherein the tag status indicates that the first sequence sample has no tag information, the sequence mining model comprises the first sub-model and the second sub-model, and the jointly training comprises jointly training the pre-trained first sub-model and the second sub-model by using the first sequence sample and the latent representation of the first sequence sample, to obtain the sequence mining model.

18. The non-transitory computer-readable storage medium according to claim 16, wherein the tag status indicates that the first sequence sample at least partially has the tag information, and a quantity of second sequence sample is greater than a quantity of third sequence sample, the second sequence sample being a portion of the first sequence sample having the tag information, and the third sequence sample being a portion of the first sequence sample without the tag information, the sequence mining model comprises the first sub-model and the third sub-model, and the jointly training comprises jointly training the pre-trained first sub-model and the third sub-model by using the second sequence sample and the latent representation of the second sequence sample, to obtain the sequence mining model.

19. The non-transitory computer-readable storage medium according to claim 16, wherein the tag status indicates that the first sequence sample at least partially has the tag information, and a quantity of second sequence sample is less than a quantity of third sequence sample, the second sequence sample being a portion of the first sequence sample having the tag information, and the third sequence sample being a portion of the first sequence sample without the tag information, the sequence mining model comprises the first sub-model, the second sub-model, and the third sub-model, and the jointly training comprises:

jointly training the pre-trained first sub-model and the third sub-model by using the second sequence sample and the latent representation of the second sequence sample, to obtain a jointly trained first sub-model;

jointly training the jointly trained first sub-model and the second sub-model by using the third sequence sample and the latent representation of the third sequence sample, to obtain the sequence mining model.

20. The non-transitory computer-readable storage medium according to claim 17, wherein the first sub-model comprises a latent vector extraction process and a reconstruction process, and the performing the pre-training of the first sub-model comprises:

processing the first sequence sample by using the latent vector extraction process, to obtain the latent representation of the first sequence sample;

processing the latent representation of the first sequence sample by using the reconstruction process, to obtain a reconstructed first sequence sample;

calculating a value of a first loss function according to the first sequence sample and the reconstructed first sequence sample, the first loss function being a loss function corresponding to the first sub-model; and adjusting a parameter of the first sub-model according to the value of the first loss function, to obtain the pre-trained first sub-model.

* * * * *